(12) United States Patent
Zhang et al.

(10) Patent No.: US 11,942,828 B2
(45) Date of Patent: Mar. 26, 2024

(54) COOLING SYSTEM, STATOR ASSEMBLY, AND AXIAL MAGNETIC FIELD MOTOR

(71) Applicant: SHANGHAI PANGOOD POWER TECHNOLOGY CO., LTD., Shanghai (CN)

(72) Inventors: Guangquan Zhang, Shanghai (CN); Lei Tang, Shanghai (CN); Liang Peng, Shanghai (CN)

(73) Assignee: SHANGHAI PANGOOD POWER TECHNOLOGY, Shanghai (CN)

( * ) Notice: Subject to any disclaimer, the term of this patent is extended or adjusted under 35 U.S.C. 154(b) by 434 days.

(21) Appl. No.: 17/422,424

(22) PCT Filed: Dec. 27, 2019

(86) PCT No.: PCT/CN2019/129106
§ 371 (c)(1),
(2) Date: Jul. 12, 2021

(87) PCT Pub. No.: WO2020/147551
PCT Pub. Date: Jul. 23, 2020

(65) Prior Publication Data
US 2022/0115924 A1     Apr. 14, 2022

(30) Foreign Application Priority Data

Jan. 14, 2019 (CN) .......................... 201910031452.9
Jan. 14, 2019 (CN) .......................... 201910031465.6
(Continued)

(51) Int. Cl.
*H02K 1/2795*   (2022.01)
*H02K 1/20*     (2006.01)
(Continued)

(52) U.S. Cl.
CPC ............. *H02K 1/2795* (2022.01); *H02K 1/20* (2013.01); *H02K 5/203* (2021.01); *H02K 9/19* (2013.01); *H02K 9/197* (2013.01)

(58) Field of Classification Search
CPC ........... H02K 5/203; H02K 1/20; H02K 9/197
See application file for complete search history.

(56) References Cited

U.S. PATENT DOCUMENTS 3,609,420 A * 9/1971 Inagaki ................ H02K 19/103
                                                    310/86
5,519,269 A * 5/1996 Lindberg ............... H02K 9/197
                                                    310/58
(Continued)

FOREIGN PATENT DOCUMENTS

CN   102396134 A   3/2012
CN   106464086 A   2/2017
(Continued)

OTHER PUBLICATIONS

European Supplemental Search Report for Application No. 19910377.1, dated Sep. 22, 2022, 17 pages.

*Primary Examiner* — Robert W Horn
(74) *Attorney, Agent, or Firm* — Lewis Roca Rothgerber Christie LLP

(57) ABSTRACT

Disclosed in the present invention are a cooling system, a stator assembly, and an axial magnetic field motor. The cooling system is used for cooling of a stator core, comprises a housing and an enclosed cavity for containing the stator core, and further comprises: a liquid spraying cavity provided on the housing and used for containing liquid; a liquid inlet in communication with the liquid spraying cavity; a liquid outlet in communication with the enclosed cavity; and a liquid spraying assembly provided on an inner wall, corresponding to the stator core, of the housing.

19 Claims, 14 Drawing Sheets

(30) Foreign Application Priority Data

Jan. 14, 2019 (CN) .......................... 201910031826.7
Mar. 19, 2019 (CN) .......................... 201910208603.3
Mar. 19, 2019 (CN) .......................... 201910208629.8

(51) Int. Cl.
*H02K 5/20* (2006.01)
*H02K 9/19* (2006.01)
*H02K 9/197* (2006.01)

(56) References Cited

U.S. PATENT DOCUMENTS

| | | | | |
|---|---|---|---|---|
| 5,670,838 | A * | 9/1997 | Everton | H02K 1/16 |
| | | | | 310/58 |
| 7,009,317 | B2 * | 3/2006 | Cronin | H02K 5/203 |
| | | | | 310/52 |
| 7,397,154 | B2 * | 7/2008 | Tilton | H02K 5/18 |
| | | | | 310/64 |
| 8,129,874 | B2 * | 3/2012 | Lambka | H02K 5/203 |
| | | | | 310/58 |
| 8,692,425 | B2 * | 4/2014 | Creviston | H02K 9/19 |
| | | | | 310/58 |
| 2011/0309699 | A1 | 12/2011 | Woolmer et al. | |
| 2012/0062055 | A1 * | 3/2012 | Murakami | H02K 5/203 |
| | | | | 310/54 |
| 2014/0125162 | A1 * | 5/2014 | Tsuchie | H02K 9/19 |
| | | | | 310/54 |
| 2017/0047822 | A1 | 2/2017 | Horii et al. | |
| 2018/0048215 | A1 * | 2/2018 | Lassila | H02K 9/19 |
| 2021/0211019 | A1 * | 7/2021 | Choi | B05B 5/16 |
| 2022/0115924 | A1 * | 4/2022 | Zhang | H02K 1/20 |

FOREIGN PATENT DOCUMENTS

| | | |
|---|---|---|
| CN | 106812606 A | 6/2017 |
| CN | 207939351 U | 10/2018 |
| CN | 109450174 A | 3/2019 |
| CN | 109462311 A | 3/2019 |
| CN | 109510341 A | 3/2019 |
| CN | 209434977 U | 9/2019 |
| CN | 209435018 U | 9/2019 |
| EP | 3028888 A1 | 6/2016 |
| JP | 2010-213412 A | 9/2010 |
| JP | 2015231291 A | 12/2015 |

\* cited by examiner

COOLING SYSTEM, STATOR ASSEMBLY, AND AXIAL MAGNETIC FIELD MOTOR

This application is a U.S. national phase of International Patent Application No. PCT/CN2019/129106, titled "COOLING SYSTEM, STATOR ASSEMBLY AND AXIAL MAGNETIC FIELD MOTOR", filed on Dec. 27, 2019, which claims the benefit of priorities to the following five Chinese patent applications, all of which are incorporated herein by reference,
1) Chinese Patent Application No. 201910031826.7, titled "COOLING SYSTEM AND MOTOR", filed on Jan. 14, 2019;
2) Chinese Patent Application No. 201910031452.9, titled "COOLING SYSTEM AND MOTOR", filed on Jan. 14, 2019;
3) Chinese Patent Application No. 201910031465.6, titled "STATOR COMPONENT AND AXIAL MAGNETIC FIELD MOTOR", filed on Jan. 14, 2019;
4) Chinese Patent Application No. 201910208629.8, titled "COOLING SYSTEM, STATOR COMPONENT AND AXIAL MAGNETIC FIELD MOTOR", filed on Mar. 19, 2019; and
5) Chinese Patent Application No. 201910208603.3, titled "STATOR COMPONENT AND AXIAL MAGNETIC FIELD MOTOR", filed on Mar. 19, 2019.

FIELD

The present application relates to the technical field of motors, and in particular to a cooling system, a stator component and an axial magnetic field motor.

BACKGROUND

Automobile driving motors in the conventional art have complex operating conditions. Due to the structural characteristics of the motor itself, various losses are generated during the operation of the motor, which causes the motor to generate heat. In order to improve the working efficiency of the motor, it is necessary to design a cooling system for the motor. The cooling system is mainly divided into two types, one is air cooling, and the other is liquid cooling. Compared with air cooling, liquid cooling is more efficient. The existing liquid cooling system mainly adopts an external cooling method, that is, the coolant is in indirect contact with core components to be cooled, and the cooling efficiency is low, which adversely affects the service life of the motor.

SUMMARY

In view of this, a technical problem to be addressed by the present application is to improve the cooling efficiency of a motor and prolong the service life of the motor. Therefore, a cooling system, a stator component and an axial magnetic field motor are provided according to the present application.

In order to achieve the above objects, the following technical solutions are provided according to the present application.

A cooling system for cooling a stator iron core, includes a housing and an enclosed chamber for containing the stator iron core, and further includes:
  a liquid spraying cavity for containing liquid, which is provided on the housing;
  a liquid inlet communicating with the liquid spraying cavity;
  a liquid outlet communicating with the enclosed chamber; and
  a liquid spraying component provided on an inner wall of the housing, which corresponds to the stator iron core.

An axial magnetic field motor includes a stator iron core and a cooling system, where the cooling system is the cooling system according to any one of the above aspects.

A cooling system for cooling a stator iron core, includes a housing and an enclosed chamber for containing the stator iron core, and further includes:
  a liquid spraying cavity for containing liquid, which is provided on the housing;
  a liquid inlet communicating with the liquid spraying cavity;
  a liquid outlet communicating with the enclosed chamber; and
  a liquid spraying hole provided on an inner wall of the housing, which corresponds to the stator iron core.

An axial magnetic field motor includes a stator iron core and a cooling system, where the cooling system is the cooling system according to any one of the above aspects.

A stator component includes a housing and a stator iron core provided inside the housing; where the stator iron core and the housing define a first cooling space, and a middle portion of the stator iron core defines a second cooling space;
  the housing is provided with a liquid inlet cavity and a liquid outlet cavity;
  a liquid inlet communicating with the liquid inlet cavity and a liquid outlet communicating with the liquid outlet cavity are provided on an outer wall of the housing;
  a first intermediate liquid port communicating with the liquid inlet cavity and a second intermediate liquid port communicating with the liquid outlet cavity are provided on an inner wall of the housing; and
  multiple cooling passages are provided on the stator iron core, and the first cooling space and the second cooling space are communicated with each other through the cooling passages.

An axial magnetic field motor includes the stator component according to any one of the above aspects.

A cooling system includes a housing, where a bottom of the housing has an installation position for installing a stator iron core. The cooling system further includes:
  an oil inlet cavity and an oil return cavity, which are provided in the housing;
  an oil inlet and an oil outlet, which are provided on an outer wall of the housing, where the oil inlet is communicated with the oil inlet cavity, and the oil outlet is communicated with the oil return cavity;
  an oil spraying hole and an oil return hole, which are provided on an inner wall of the housing, where the oil spraying hole is communicated with the oil inlet cavity, and the oil return hole is communicated with the oil return cavity; and
  multiple oil diverting grooves provided at the bottom of the housing, where the oil diverting grooves penetrate through the installation position.

A stator component includes a stator iron core and the cooling system according to any one of the above aspects, where the stator iron core is provided on an installation position of the housing of the cooling system; where an outer ring of the stator iron core and the housing define a first cooling space, and an inner ring of the stator iron core and the housing define a second cooling space.

An axial magnetic field motor includes the stator component according to any one of the above aspects.

A stator component includes a housing, a stator iron core, a coil, a pole shoe, and a stator cover plate, where the stator iron core, the coil and the pole shoe are provided in a space defined by the housing and the stator cover plate; where the coil is provided in an open slot of the stator iron core, the pole shoe is fixed on the stator cover plate, and when the stator cover plate is butted with the housing, the pole shoe can be arranged at a notch of the open slot; an outer ring of the stator iron core and the housing define a first cooling space, and an inner ring of the stator iron core and the housing define a second cooling space communicating with the first cooling space, a housing wall of the housing is provided with an oil inlet cavity and an oil return cavity, and an outer wall of the housing is provided with an oil inlet and an oil outlet; where the oil inlet is communicated with the oil inlet cavity, and the oil outlet is communicated with the oil return cavity; an inner wall of the housing is provided with an oil spraying hole and an oil return hole, and the first cooling space and the oil inlet cavity are communicated with each other through the oil spraying hole, and the first cooling space and the oil return cavity are communicated with each other through the oil return hole.

An axial magnetic field motor includes the stator component according to any one of the above aspects.

It can be seen from the above technical solutions that, when adopting the cooling system of the present application, liquid enters the liquid spraying cavity from the liquid inlet, and the liquid is sprayed to the stator iron core located in the enclosed chamber through the liquid spraying hole. After the liquid sprayed from the liquid spraying hole exchanges heat with the stator iron core, it flows out from the liquid outlet. Compared with the conventional art, the circulating liquid directly contacts the stator iron core to exchange heat, thereby improving the cooling efficiency of the motor and prolonging the service life of the motor.

BRIEF DESCRIPTION OF THE DRAWINGS

In order to illustrate technical solutions in the embodiments of the present application or in the conventional technology more clearly, drawings used in the description of the embodiments or the conventional technology are introduced briefly hereinafter. Apparently, the drawings described hereinafter merely illustrate some embodiments of the present application, and other drawings may be obtained by those skilled in the art based on these drawings without any creative efforts.

Figure 1:
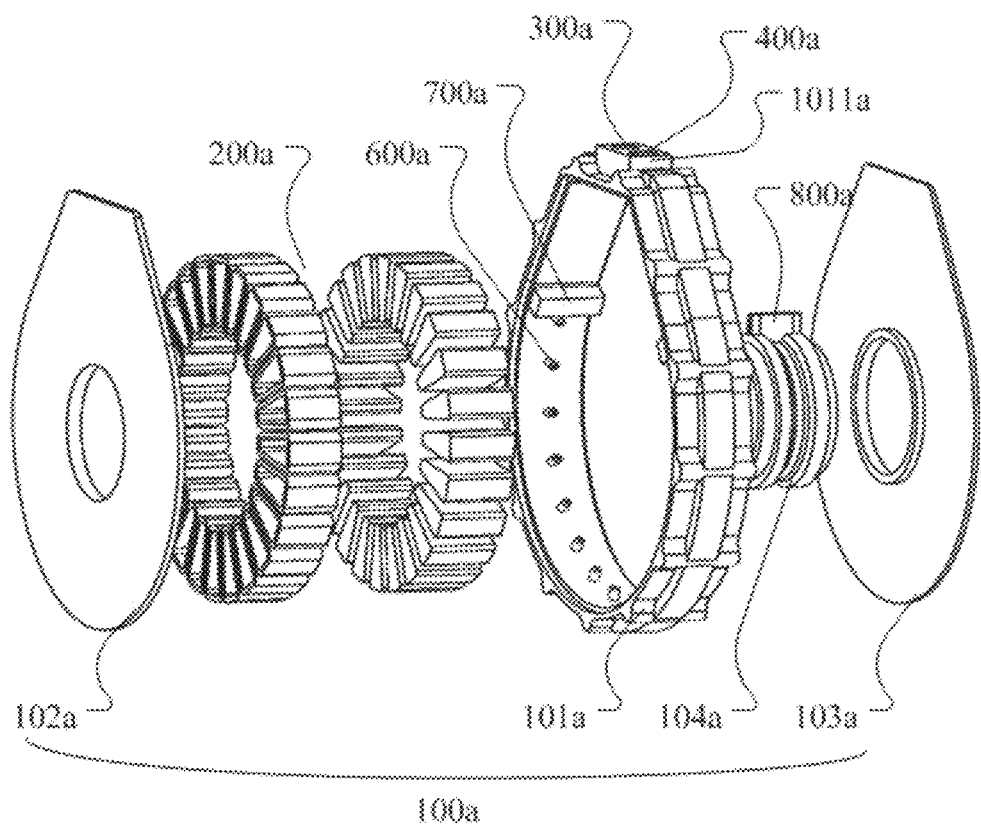
FIG. 1 is a schematic exploded view showing the structure of a cooling system provided by a first embodiment of the present application.
Figure 2:
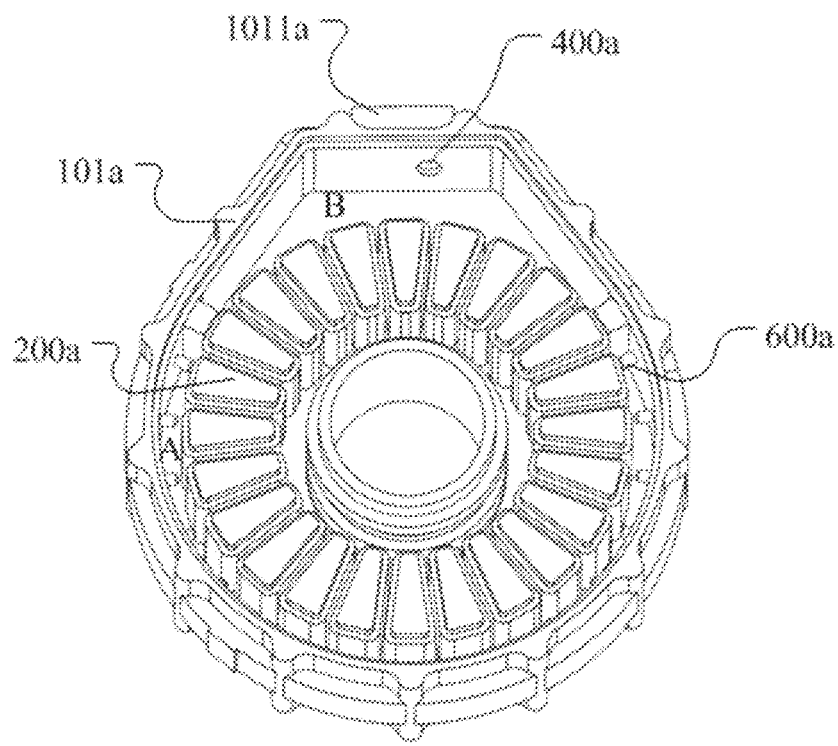
FIG. 2 is a schematic perspective view showing the structure of the cooling system provided by the first embodiment of the present application.

Reference numerals in the figures,

| | |
|---|---|
| 100a housing; | 200a stator iron core; |
| 300a liquid inlet; | 400a liquid outlet; |
| 500a liquid spraying cavity; | 600a liquid spraying component; |
| 700a first spoiler; | 800a second spoiler; |
| 101a stator casing; | 102a upper cover plate; |
| 103a lower cover plate; | 104a intermediate shaft sleeve; |
| 1011a external port; | |

Figure 5:
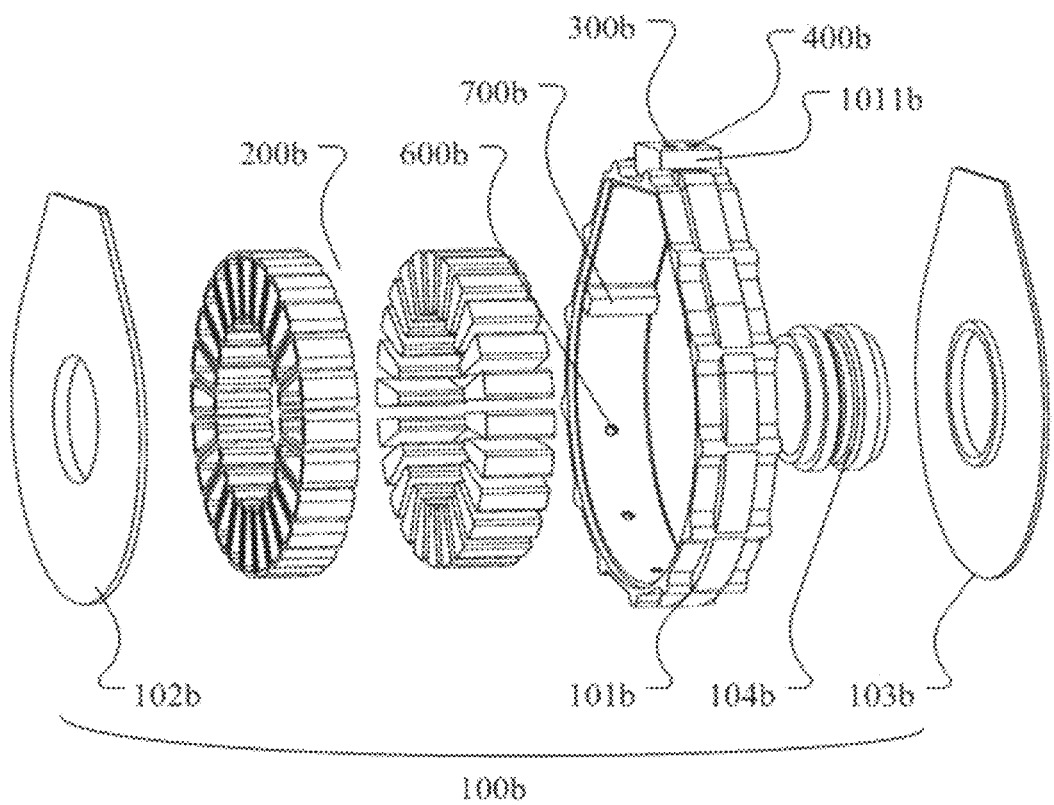
Figure 6:
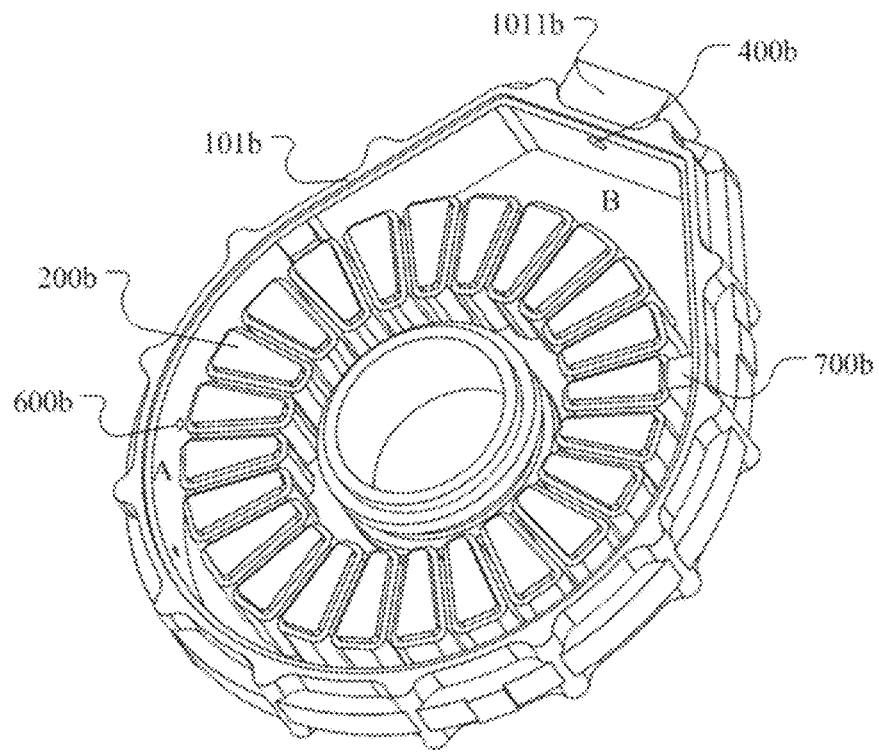
Figure 7:
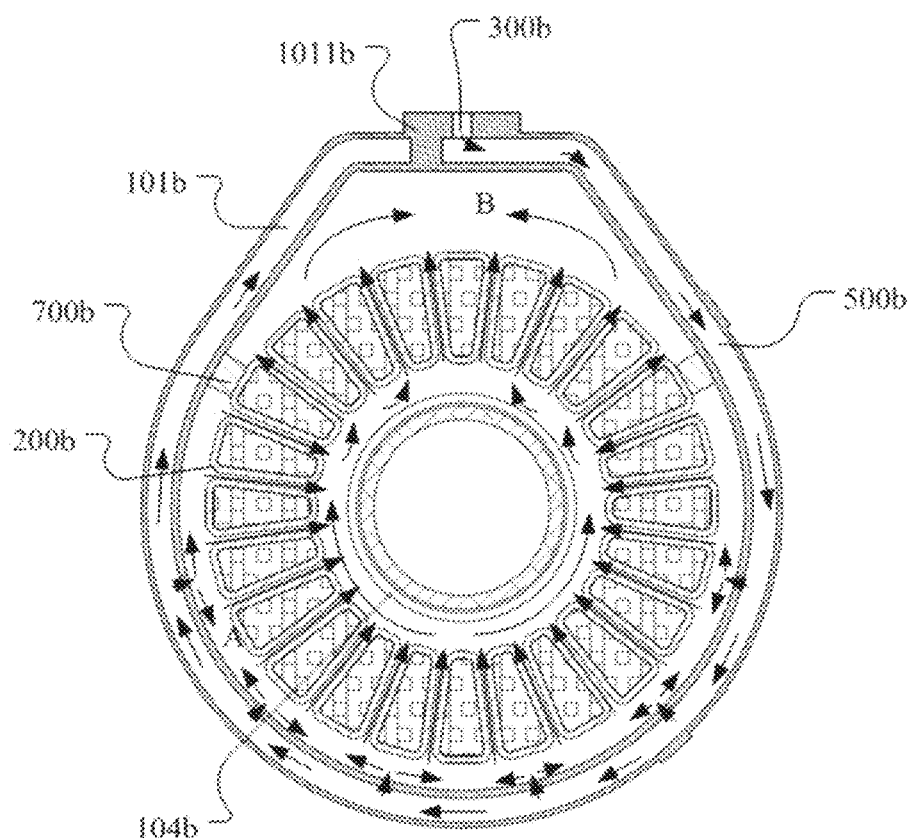
Figure 8:
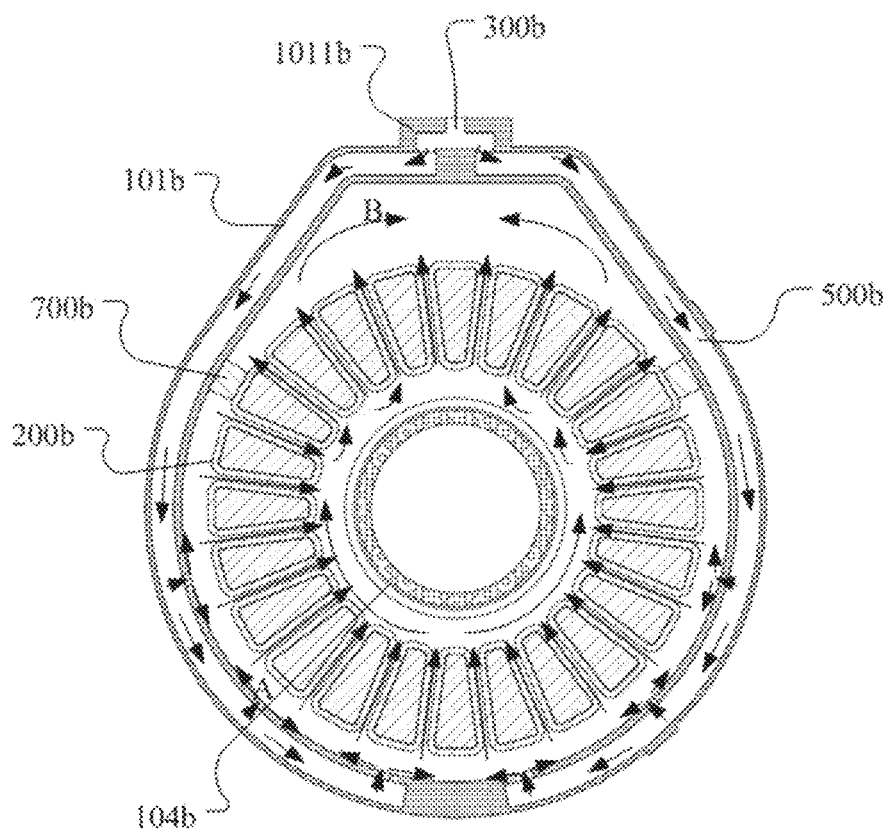

FIG. 5 is a schematic exploded view showing the structure of a cooling system provided by a second embodiment of the present application;

FIG. 6 is a schematic perspective view showing the structure of the cooling system provided by the second embodiment of the present application;

FIG. 7 is a schematic diagram of a principle of the cooling system provided by the second embodiment of the present application;

FIG. 8 is a schematic diagram of a principle of another cooling system provided by the second embodiment of the present application;

Reference numerals in the figures,

| | |
|---|---|
| 100b housing; | 200b stator iron core; |
| 300b liquid inlet; | 400b liquid outlet; |
| 500b liquid spraying cavity; | 600b liquid spraying hole; |
| 700a first spoiler; | 101b stator casing; |
| 102b upper cover plate; | 103b lower cover plate; |
| 104b intermediate shaft sleeve; | 1011b external port; |

Figure 9:
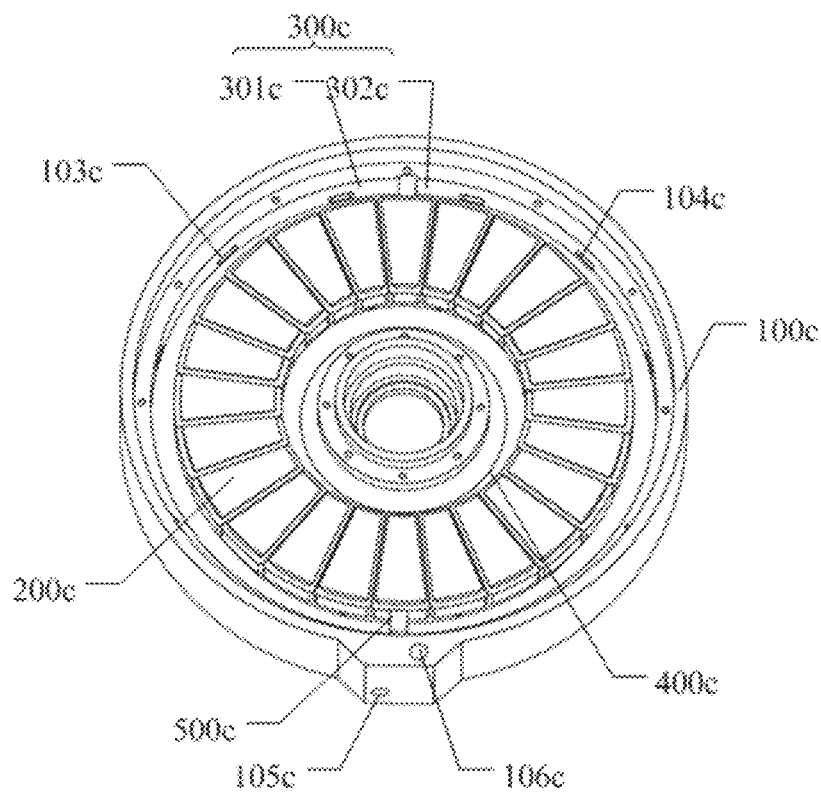
Figure 10:
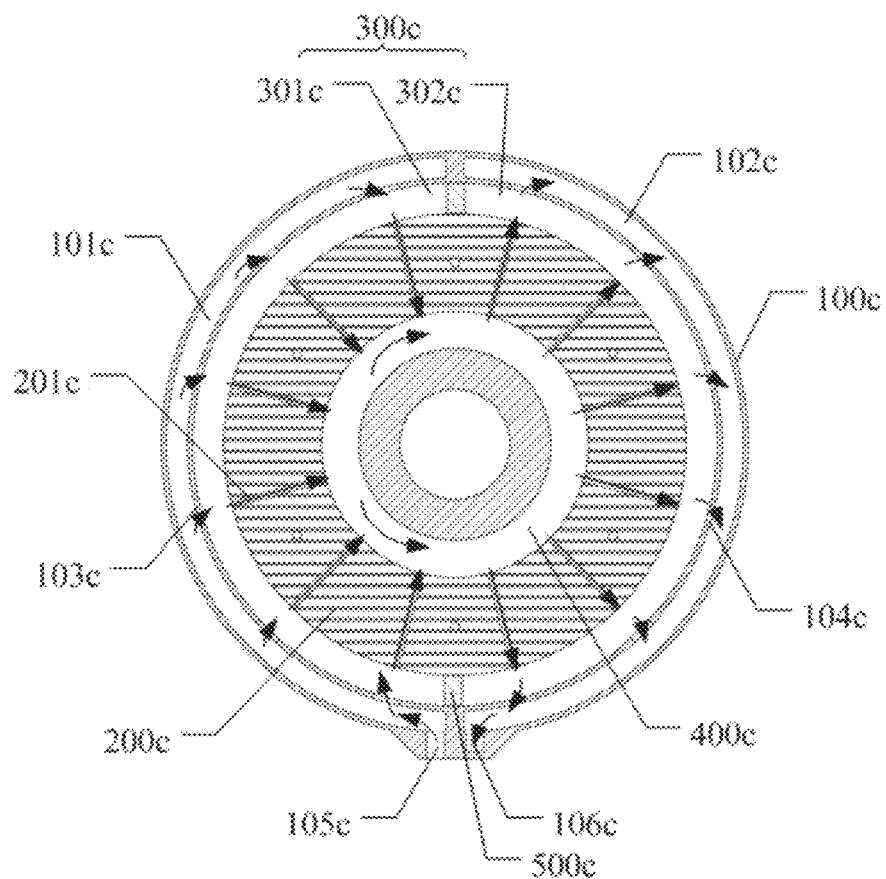
Figure 11:
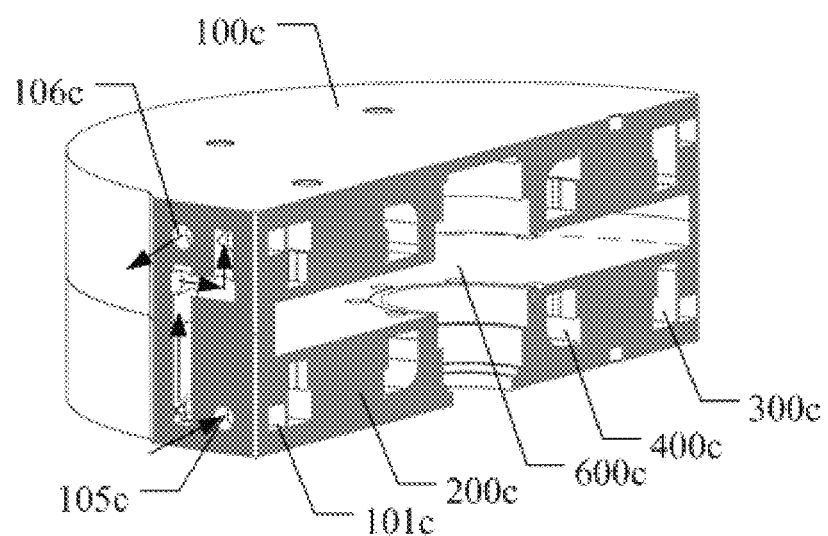
Figure 12:
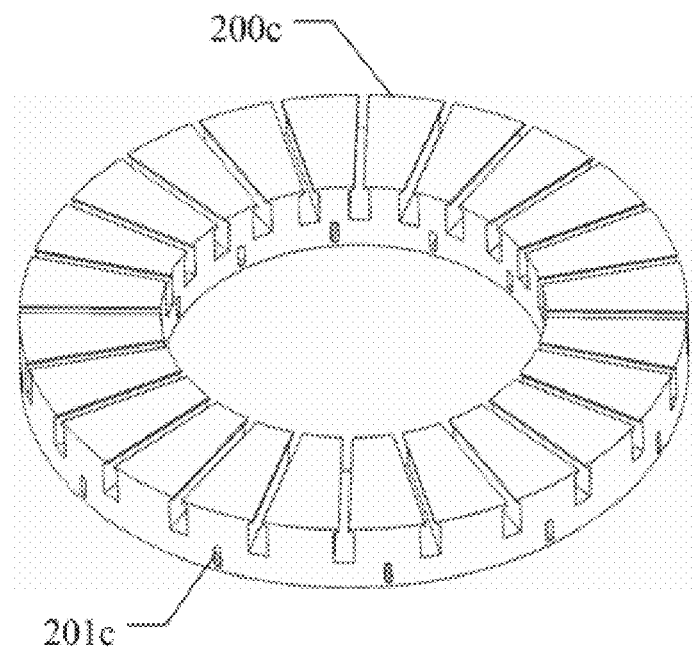
Figure 13:
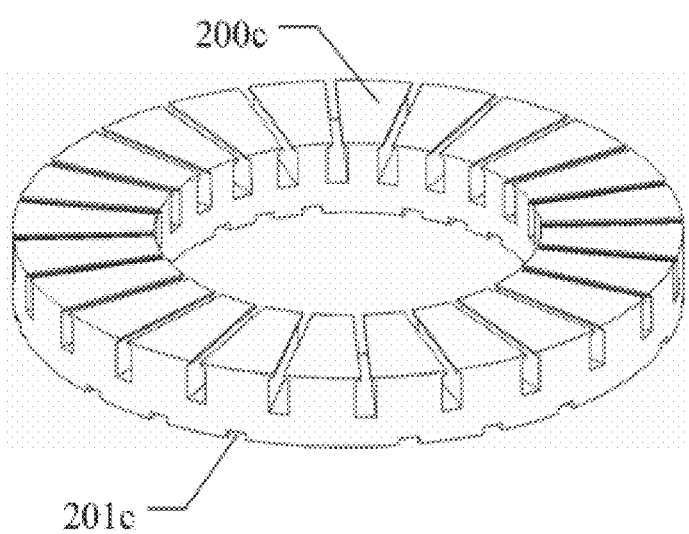
Figure 14:
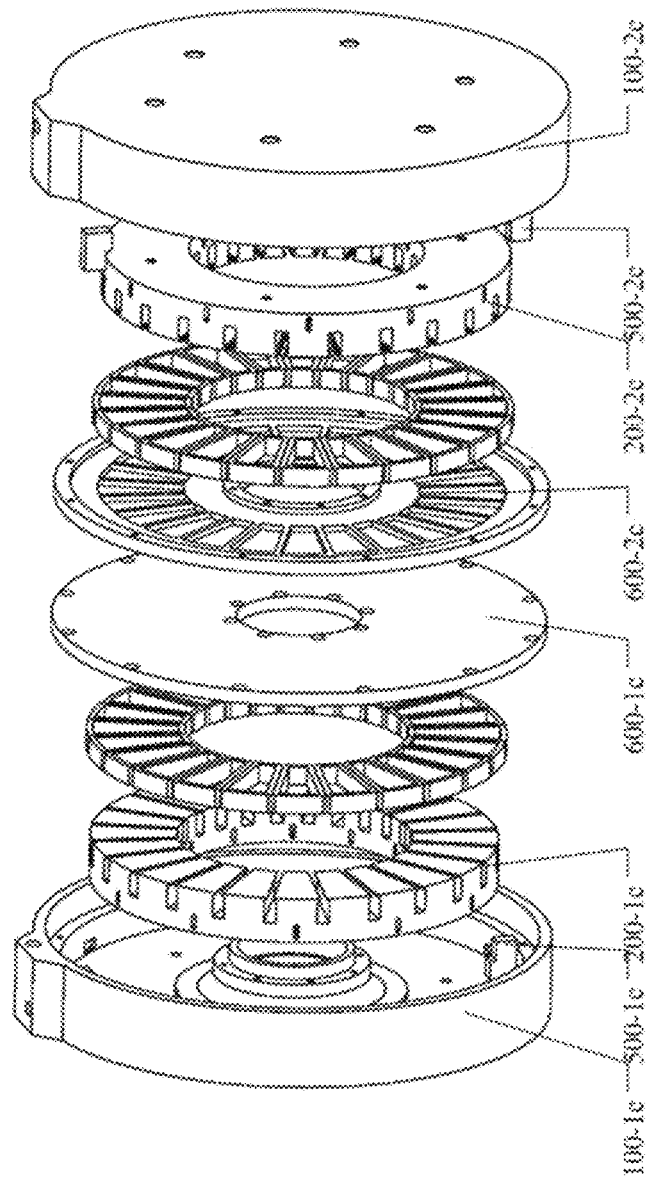

FIG. 9 is a schematic perspective view showing the structure of a stator component provided by a third embodiment of the present application;

FIG. 10 is a schematic sectional view showing the structure of the stator component provided by the third embodiment of the present application;

FIG. 11 is a schematic perspective view of a cross section of the stator component provided by the third embodiment of the present application;

FIG. 12 is a schematic perspective view showing the structure of a stator iron core provided by the third embodiment of the present application;

FIG. 13 is a schematic perspective view showing the structure of another stator iron core provided by the third embodiment of the present application;

FIG. 14 is a schematic exploded view showing the structure of the stator component provided by the third embodiment of the present application;

Reference numerals in the figures,

| | |
|---|---|
| 100c housing; | 200c stator iron core; |
| 300c first cooling space; | 400c second cooling space; |
| 500c spoiler; | 600c stator pressing plate; |
| 101c liquid inlet cavity; | 102c liquid outlet cavity; |
| 103c first intermediate liquid port; | 106c liquid outlet; |
| 104c second intermediate liquid port; | 301c first cooling area; |
| 105c liquid inlet; | 200-1c front stator iron core; |
| 201c cooling passage; | 600-1c front stator pressing plate; |
| 302c second cooling area; | 200-2c rear stator iron core; |
| 100-1c front housing; | 600-2c rear stator pressing plate; |
| 500-1c front spoiler; | |
| 100-2c rear housing; | |
| 500-2c rear spoiler; | |

Figure 15:
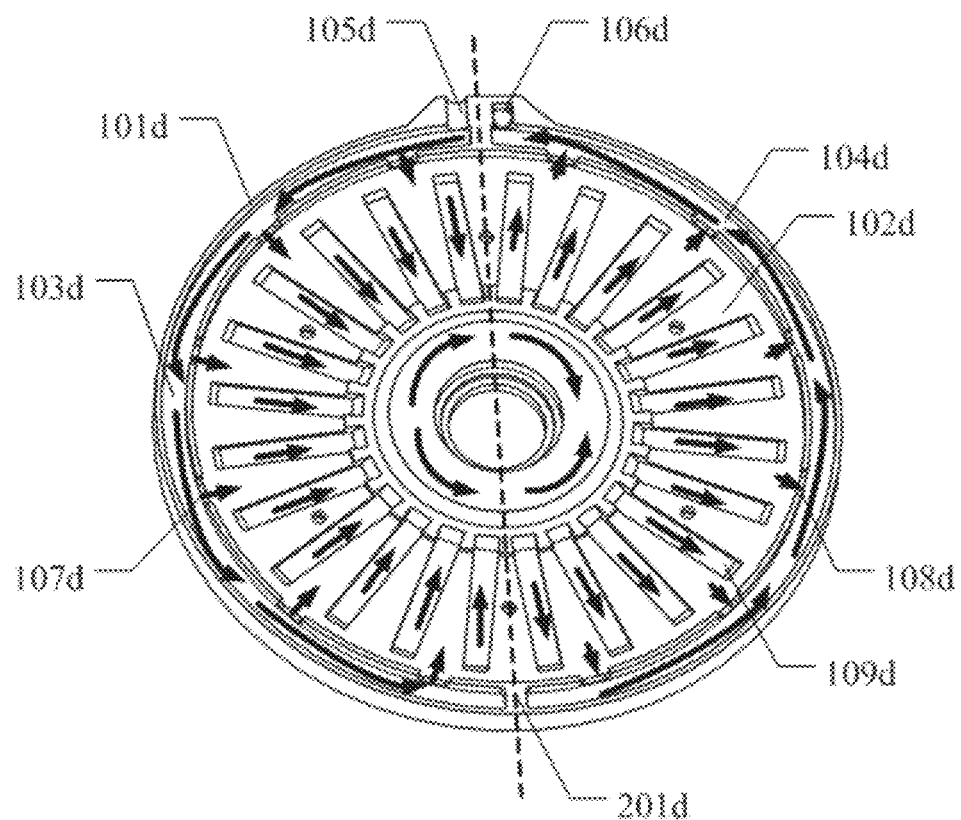
Figure 16:
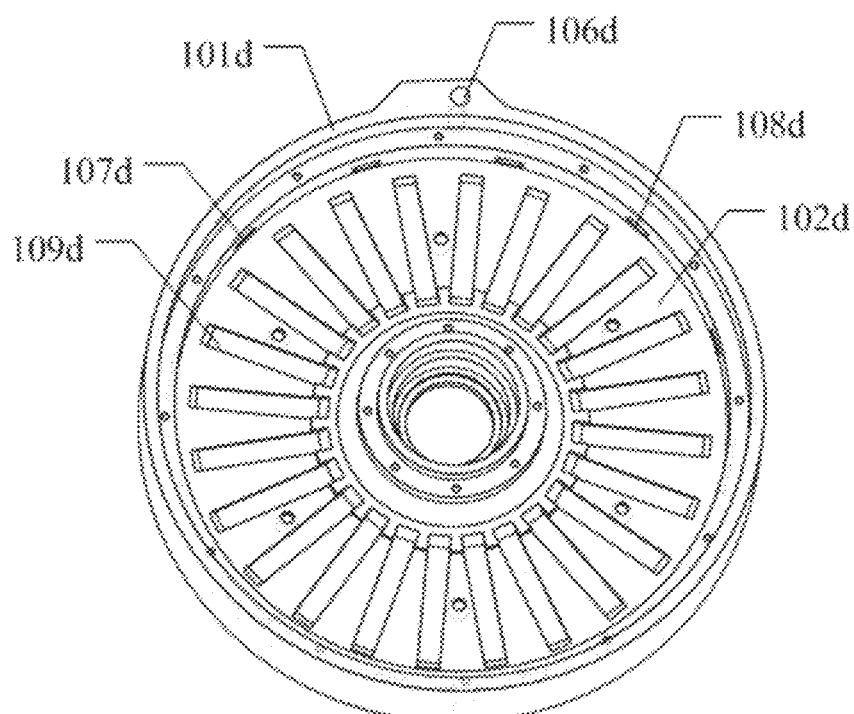
Figure 17:
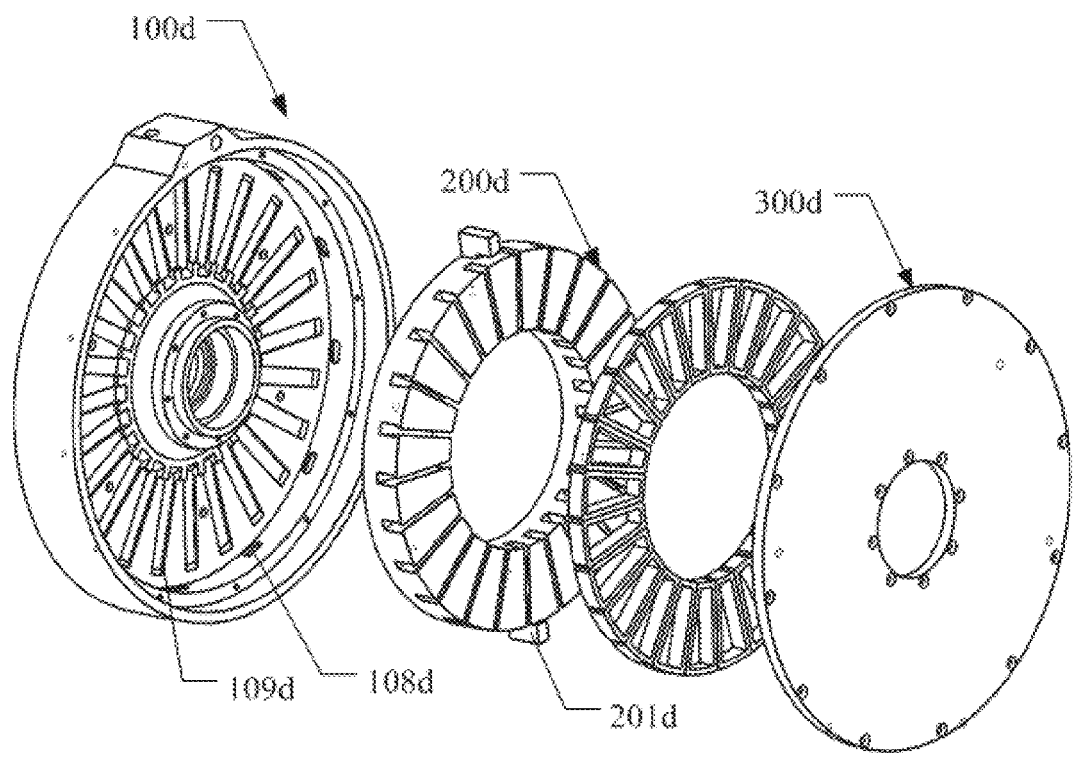
Figure 18:
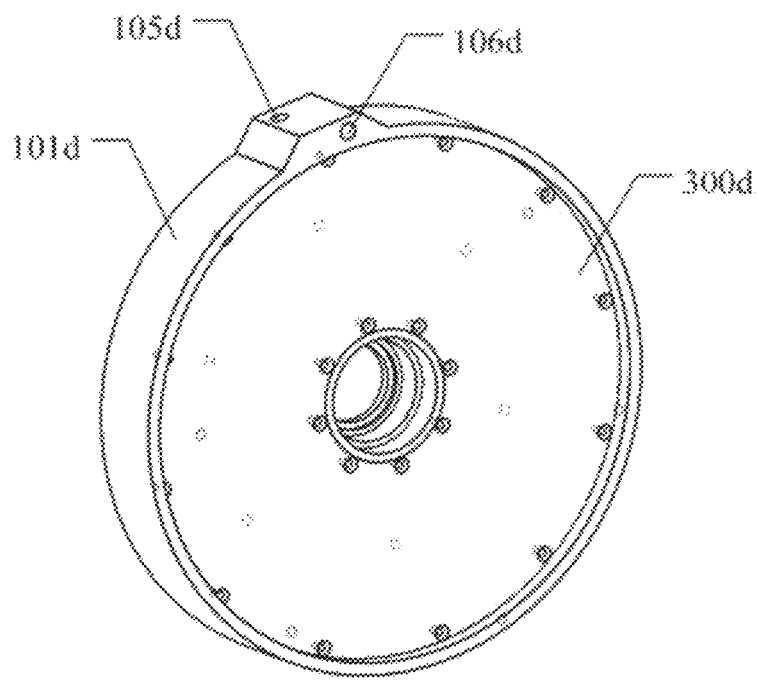
Figure 19:
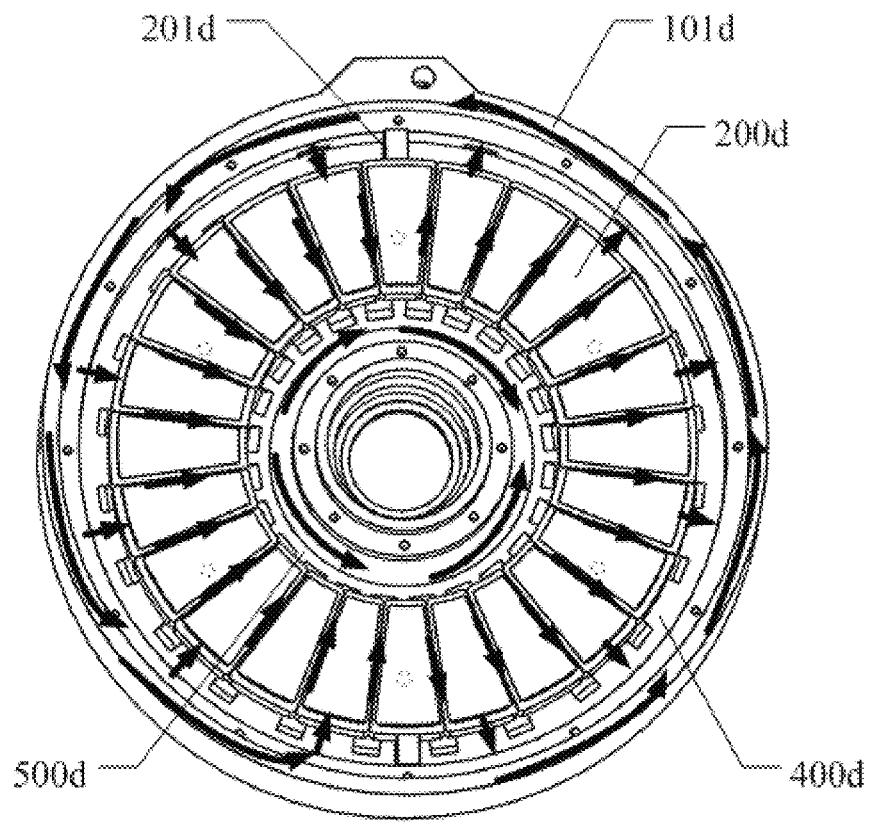
Figure 20:
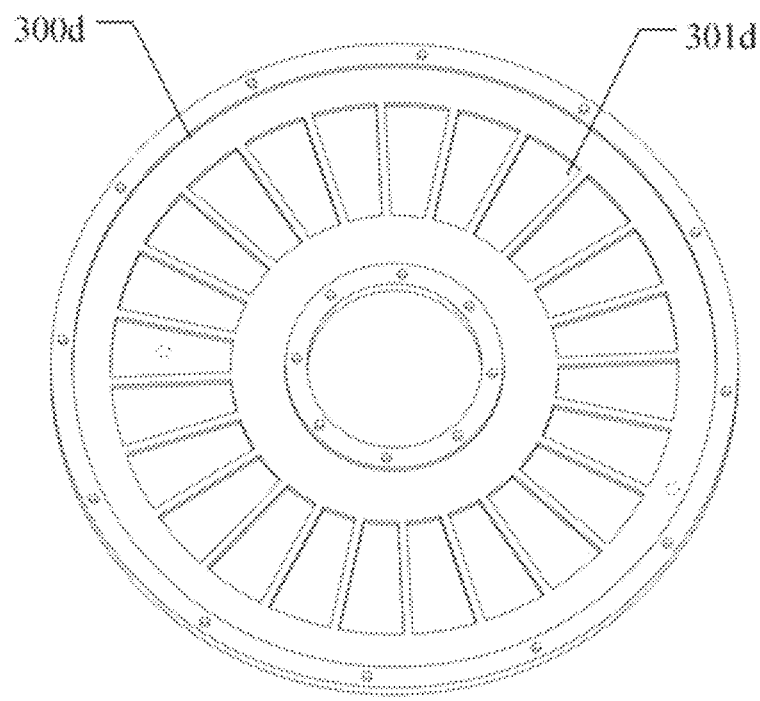

FIG. 15 is a schematic sectional view showing the structure of a cooling system provided by a fourth embodiment of the present application;

FIG. 16 is a schematic perspective view showing the structure of another cooling system provided by the fourth embodiment of the present application;

FIG. 17 is a schematic exploded view showing the structure of a stator component provided by the fourth embodiment of the present application;

FIG. 18 is a schematic perspective view showing the structure of the stator component provided by the fourth embodiment of the present application;

FIG. 19 is a schematic perspective view showing the structure of the stator component provided by the fourth embodiment of the present application;

FIG. 20 is a schematic perspective view showing the structure of a sealing cover plate provided by the forth embodiment of the present application;

Reference numerals in the figures,

| | |
|---|---|
| 100d cooling system; | 200d stator iron core; |
| 300d sealing cover plate; | 400d first cooling space; |
| 500d second cooling space; | 101d housing; |
| 102d installation position; | 103d oil inlet cavity; |
| 104d oil return cavity; | 105d oil inlet; |
| 106d oil outlet; | 107d oil spraying hole; |
| 108d oil return hole; | 109d oil diverting groove; |
| 201d spoiler; | 301d clamping slot; |

Figure 21:
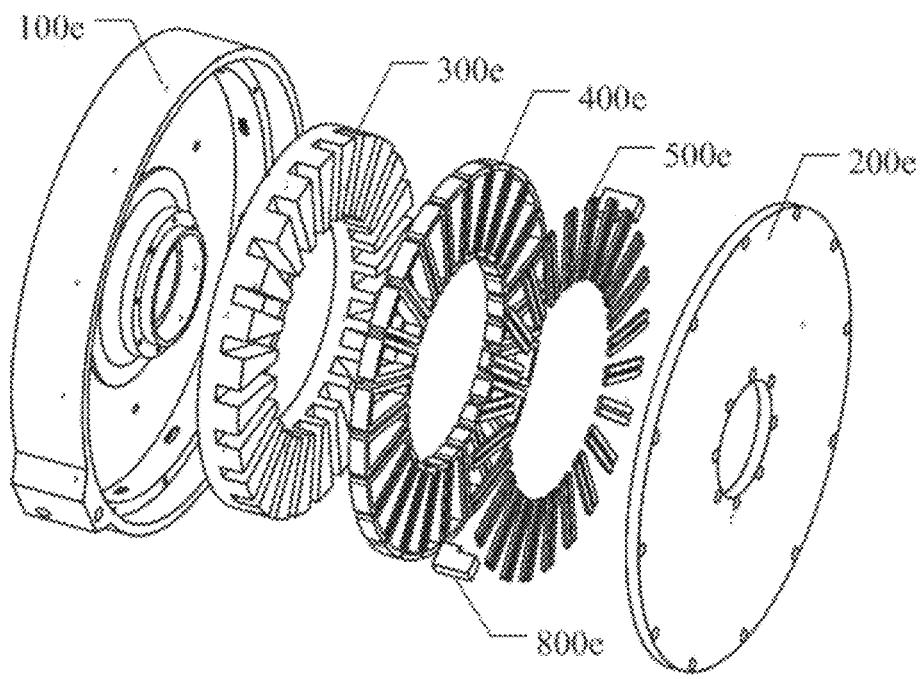
Figure 22:
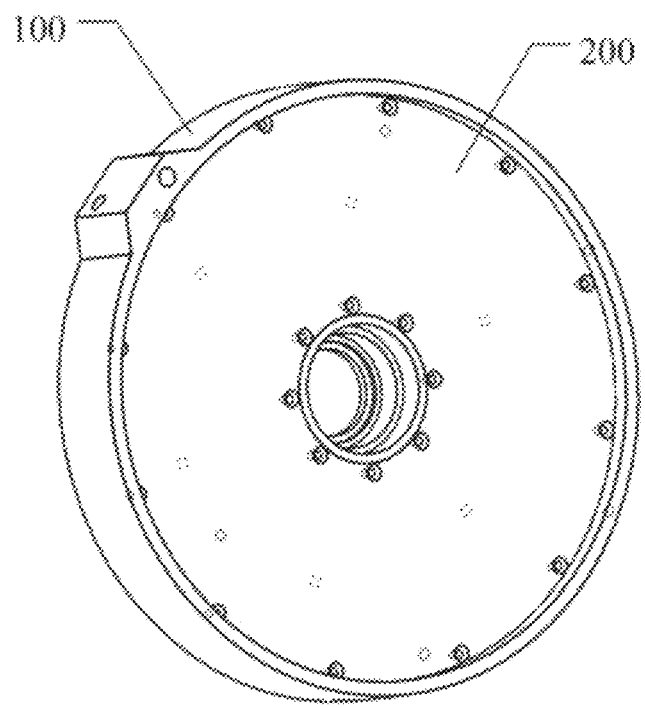
Figure 23:
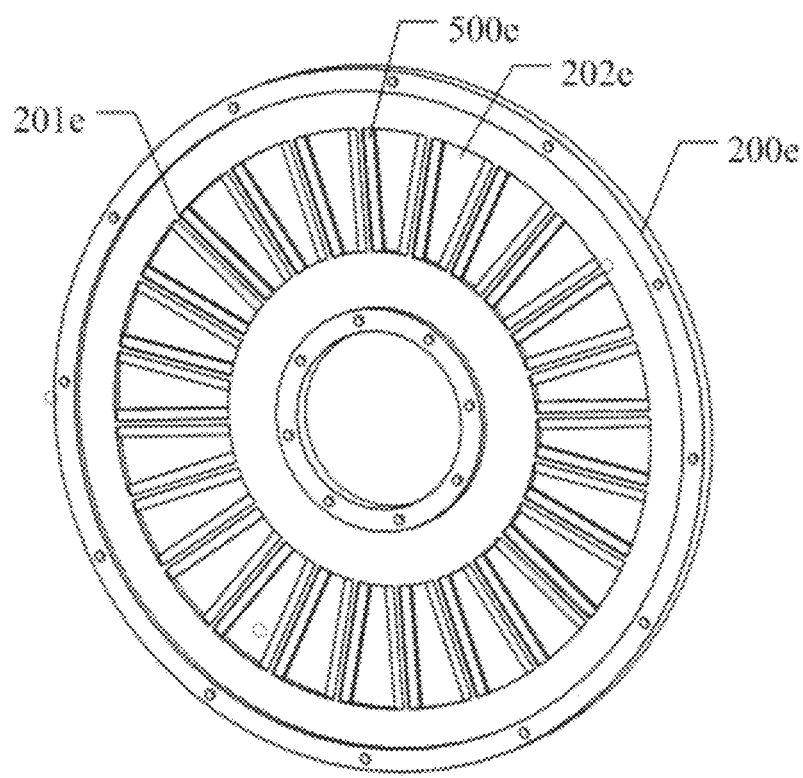
Figure 24:
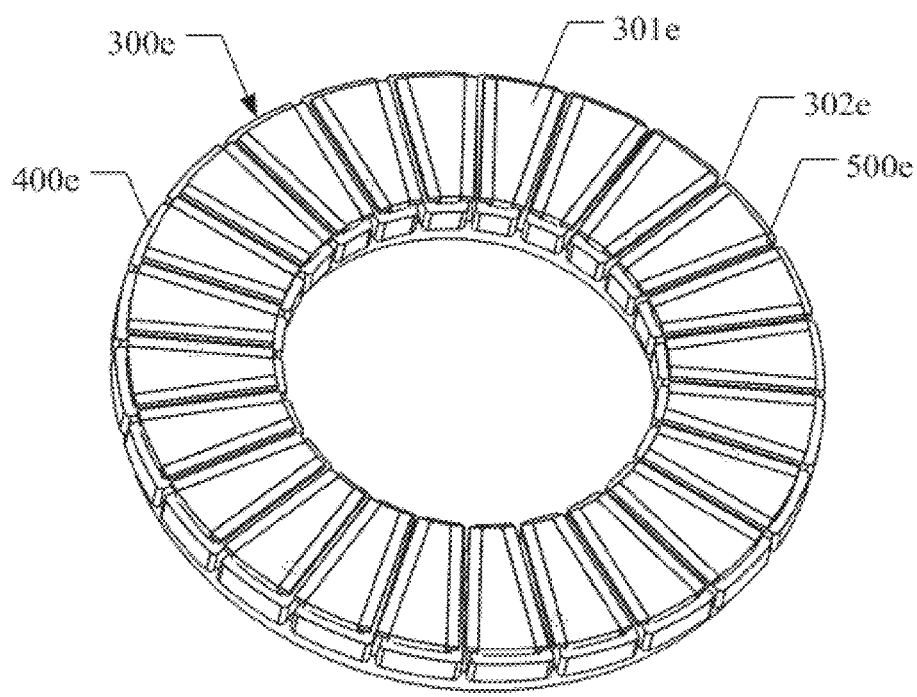
Figure 25:
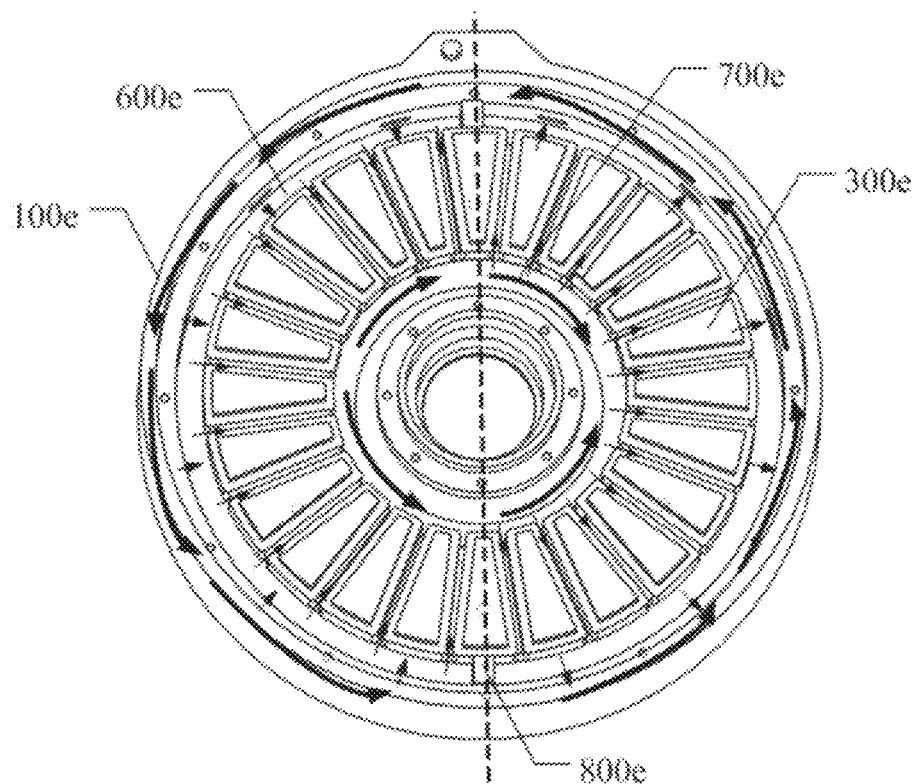
Figure 26:
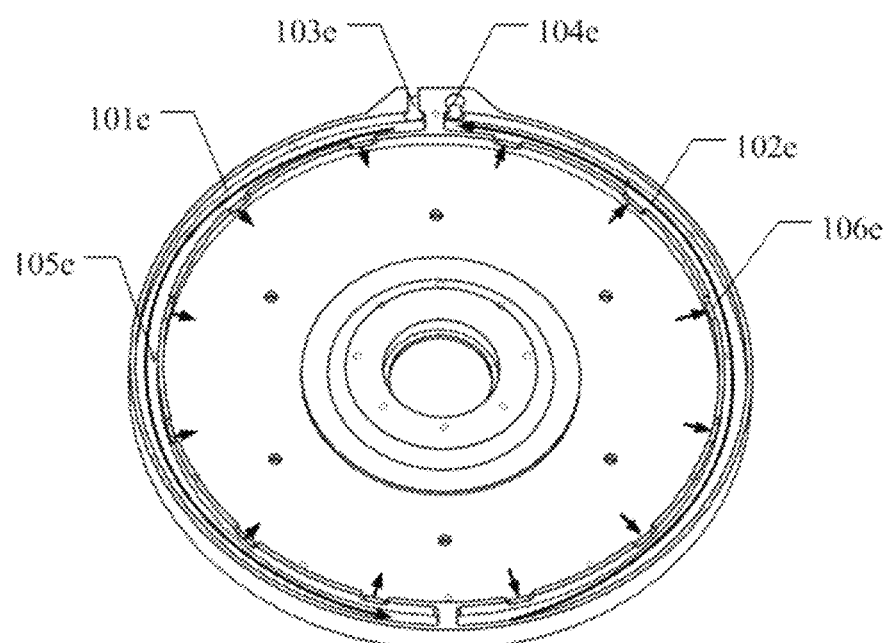

FIG. 21 is a schematic exploded view showing the structure of a stator component provided by a fifth embodiment of the present application;

FIG. 22 is a schematic perspective view showing the structure of the stator component provided by the fifth embodiment of the present application;

FIG. 23 is a schematic structural view of a stator cover plate provided by the fifth embodiment of the present application;

FIG. 24 is a schematic perspective view showing the structure of a stator iron core provided by the fifth embodiment of the present application;

FIG. 25 is a schematic diagram of a cooling principle of the stator iron core provided by the fifth embodiment of the present application;

FIG. 26 is a schematic perspective view showing the structure of a housing provided by the fifth embodiment of the present application;

Reference numerals in the figures,

| | |
|---|---|
| 100e housing; | 200e stator cover plate; |
| 300e stator iron core; | 400e coil; |
| 500e pole shoe; | 600e first cooling space; |
| 700e second cooling space; | 800e spoiler; |
| 101e oil inlet cavity; | 102e oil return cavity; |
| 103e oil inlet; | 104e oil outlet; |
| 105e oil spraying hole; | 106e oil return hole; |
| 201e groove rib; | 202e iron core tooth groove, |
| 301e tooth, | 302e open slot. |

DETAILED DESCRIPTION OF THE EMBODIMENTS

First Embodiment

A core of the present application is to provide a cooling system and an axial magnetic field motor to improve the cooling efficiency of the motor and prolong the service life of the motor.

In addition, the embodiments shown below do not limit the content of the present application described in the claims in any way. Further, the entire contents of the configurations described in the following embodiments may not be necessary for the solutions of the present application defined in the claims.

Referring to FIGS. 1 to 4, a cooling system in the embodiment of the present application is used for cooling a stator iron core 200a. The cooling system includes: a housing 100a; an enclosed chamber for containing the stator iron core 200a; a liquid spraying cavity 500a for containing liquid, which is provided on the housing 100a; a liquid inlet 300a communicating with the liquid spraying cavity 500a; a liquid outlet 400a communicating with the enclosed chamber; and a liquid spraying component 600a provided on an inner wall of the housing 100a, which corresponds to the stator iron core 200a.

When adopting the cooling system of the present application, liquid enters the liquid spraying cavity 500a from the liquid inlet 300a, and the liquid is sprayed to the stator iron core 200a located in the enclosed chamber through the liquid spraying component 600a. After the liquid sprayed from the liquid spraying component 600a exchanges heat with the stator iron core 200a, it flows out from the liquid outlet 400a. Compared with the conventional art, the circulating liquid directly contacts the stator iron core 200a to exchange heat, thereby improving the cooling efficiency of the motor and prolonging the service life of the motor.

It should be noted that the housing 100a is configured to contain the stator iron core 200a, and an enclosed chamber is formed inside. When the stator iron core 200a is installed in the enclosed chamber, liquid sprayed by the liquid spraying component 600a may circulate through a gap of the coil of the stator iron core 200a, and finally flow out from the liquid outlet 400a, thereby forming a kind of cooling circulation circuit.

The liquid spraying cavity 500a is provided in a housing wall of the housing 100a, that is, a section where the liquid spraying cavity 500a is provided is a hollow structure. The liquid spraying cavity 500a can be adjusted according to a section where the liquid spraying component 600a is provided. For example, the housing 100a may surround a peripheral surface section of the stator iron core 200a, or an end surface section of the housing 100a may surround a peripheral surface section of the stator iron core 200a. The installation positions of the liquid inlet 300a and the liquid outlet 400a are further determined according to an installation position of the liquid spraying cavity 500a.

The housing 100a may have any shape, as long as it is capable of accommodating the liquid spraying cavity 500a and the liquid spraying component 600a, it is within the protection scope of the present application. In an embodiment of the present application, the housing 100a includes:

a stator casing 101a surrounding a circumferential surface of the stator iron core 200a;

an upper cover plate 102a and a lower cover plate 103a that close two ends of the stator casing 101a; and an intermediate shaft sleeve 104a located in the middle of the stator casing 101a, where the stator casing 101a, the upper cover plate 102a, the lower cover plate 103a and the intermediate shaft sleeve 104a together define the enclosed chamber.

It can be seen that in the embodiment of the present application, an entirety the housing 100a is divided into four sections, and the housing 100a may also be divided into three sections according to specific requirements. For example, the upper cover plate 102a and the stator casing 101a are treated as a one-piece structure, and the lower cover plate 103a and the stator casing 101a are treated as a one-piece structure. Alternatively, one part of the stator casing 101a and the upper cover plate 102a are treated as a one-piece structure, and the other part of the stator casing 101a and the lower cover plate 103a are treated as a one-piece structure, etc.

In order to further improve the cooling efficiency, in another embodiment of the present application, a first spoiler 700a is provided on an inner wall of the stator casing 101a. An area of the enclosed chamber, which is close to the liquid outlet 400a, is separated as a liquid return area by the first spoiler 700a, and an area close to the liquid spraying component 600a is separated as a liquid spraying area.

Under the action of the first spoiler 700a, the enclosed chamber is divided into the liquid return area and the liquid spraying area. The liquid spraying component 600a sprays liquid in the liquid spraying area. After the sprayed liquid exchanges heat with the stator iron core 200a, it is collected in the liquid return area and flows out through the liquid outlet 400a. Therefore, under the action of the first spoiler 700a, the liquid sprayed by the liquid spraying component 600a can flow uniformly from the outside of the stator iron core 200a to the inside, so that the stator iron core 200a can be uniformly cooled.

The number of the first spoiler 700a may be one or more, as long as the structure is capable of blocking the liquid flow, it is within the protection scope of the present application. In the figure, the number of the first spoiler 700a is two, which are respectively located on two sides of the liquid outlet 400a. As a result, an area between the two first spoilers 700a which is close to the liquid outlet 400a, is formed as the liquid return area, and an area between the two first spoilers 700a which is away from the liquid outlet 400a, is formed as a liquid spraying area. The liquid spraying components 600a are all provided on an inner wall of the stator casing 101a in the liquid spraying area.

Further, a second spoiler 800a is provided at a section close to the liquid outlet 400a, of the intermediate shaft sleeve 104a. A function of the second spoiler 800a is to cause the liquid located inside the stator iron core 200a to evenly flow from the inside of the stator iron core 200a to the liquid return area, so as to improve the cooling efficiency.

According to the structure of the housing, a liquid spraying cavity 500a may be provided on the stator casing 101a, the upper cover plate 102a or the lower cover plate 103a, and accordingly, the liquid inlet 300a and the liquid outlet 400a may be arranged on the stator casing 101a, the upper cover plate 102a or the lower cover plate 103a. In the embodiment of the present application, the liquid spraying cavity 500a is arranged on the stator casing 101a, and the liquid inlet 300a and/or the liquid outlet 400a are arranged on the stator casing 101a.

Figure 3:
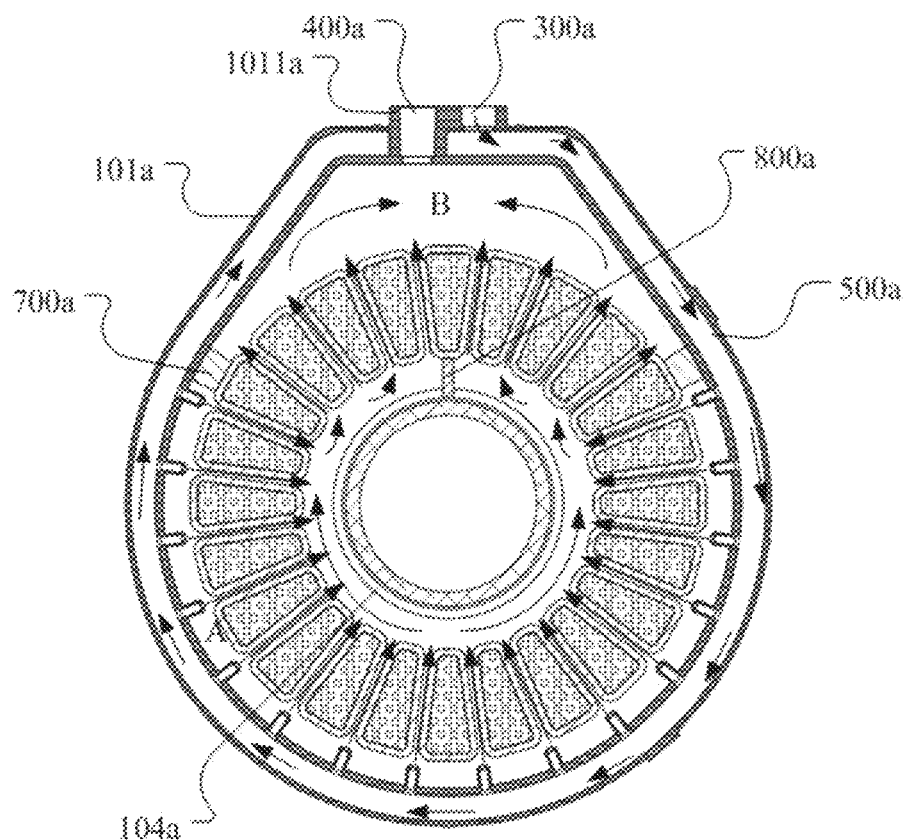
FIG. 3 is a schematic diagram of a principle of the cooling system provided by the first embodiment of the present application.
Figure 4:
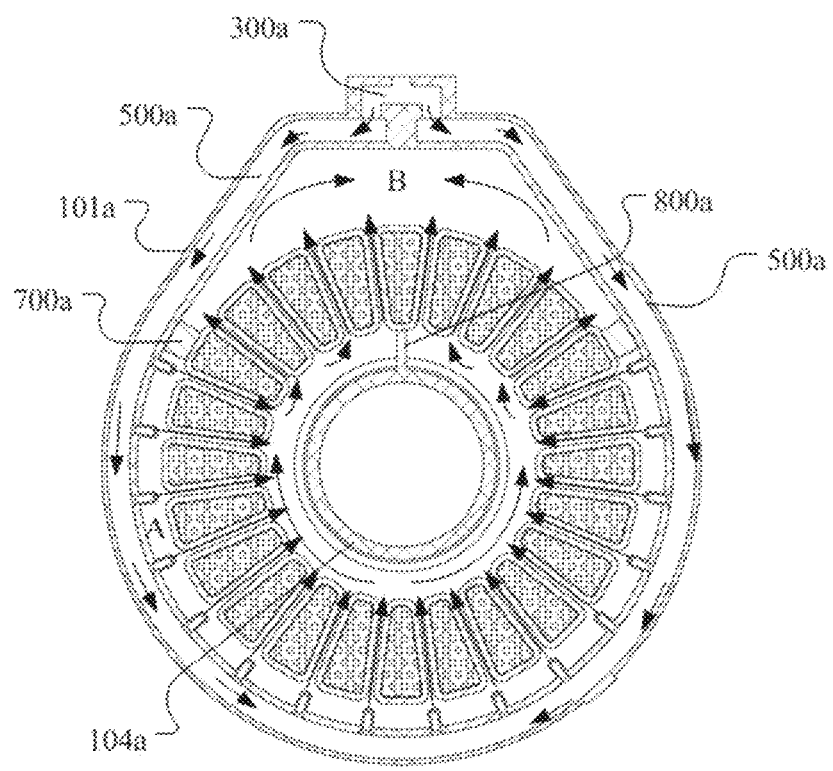
FIG. 4 is a schematic diagram of a principle of another cooling system provided by the first embodiment of the present application.

The liquid spraying cavity 500a includes one or two liquid inlets 300a. In a case that there is one liquid inlet 300a, the liquid inlet is arranged at one end of the liquid spraying cavity 500a, as shown in FIG. 3; in a case that there are two liquid inlets 300a, the two liquid inlets 300a are arranged at two ends of the liquid spraying cavity 500a, as shown in FIG. 4.

Two liquid inlets 300a are provided, which are respectively located at two ends of the liquid spraying cavity 500a, and an external port of the liquid inlet 300a has one outlet. Or, there is one liquid inlet 300a located at one end of the liquid spraying cavity 500a, and a corresponding external port of the liquid inlet 300a has one outlet.

In a case that the liquid spraying cavity 500a is provided on the stator casing 101a, the liquid spraying cavity 500a may have a ring-shaped structure that surrounds the entire stator casing 101a or a part of the stator casing 101a. In order to simplify the processing technology, the liquid inlet 300a and the liquid outlet 400a are collectively provided on an external port 1011a of the first housing 100a. Apparently, the external ports 1011a of the liquid inlet 300a and the liquid outlet 400a may be separately provided as needed.

Further, in a case that two liquid inlets 300a are provided and the two liquid inlets 300a are located at the two ends of the liquid spraying cavity 500a, in order to avoid the formation of turbulent flow of the liquid located in the middle, a partition plate is provided in the middle of the liquid spraying cavity 500a.

It should be noted that the stator casing 101a is a one-piece structure or a split-type structure. The so-called one-piece structure means that when the stator casing 101a is processed, the structure of the liquid spraying cavity 500a is processed together, for example, in a casting process. In a case that the stator casing 101a has a split-type structure, the stator casing 101a includes: a stator base housing with a hollow structure and a sealing ring for sealing the hollow structure. The sealing ring and the stator base housing jointly define the liquid spraying cavity 500a.

A function of the liquid spraying component 600a is to cool the stator iron core 200a through spraying. In the embodiment of the present application, the liquid spraying component is a nozzle. The liquid sprayed into the liquid spraying cavity 500a has a certain pressure. Under the action of pressure, after the action of the liquid spraying component 600a, the sprayed liquid is a fine liquid, thereby increasing the contact area between the liquid and the stator iron core 200a. The number of the liquid spraying component 600a is one or more, and multiple liquid spraying components 600a are capable of further increasing a spray area of the liquid spraying component 600a. Further, each liquid spraying component 600a corresponds to a coil gap of the stator iron core 200a, and each coil gap corresponds to a liquid spraying component. The liquid sprayed by the liquid spraying component can directly contact a heat source, and the cooling effect is better. The liquid can be divided evenly under the action of the first spoiler 700a and the second spoiler 800a, and the cooling is more uniform, which desirably reduces the temperature of the stator iron core 200a.

The present application further discloses a motor, which includes a stator iron core 200a and a cooling system, where the cooling system is the cooling system according to any one of the above aspects. Since the above cooling system has the above effects, the motor including the above cooling system also has corresponding effects, which is not repeated here.

In yet another embodiment of the present application, the motor is a radial magnetic field motor or an axial magnetic field motor, and is preferably selected as an axial magnetic field motor.

According to the above description of the disclosed embodiments, those skilled in the art may implement or practice the present application. Various modifications to the embodiments are apparent to those skilled in the art. The general principle defined herein may be implemented in other embodiments without departing from the spirit or scope of the present application. Therefore, the present application should not be limited to the embodiments disclosed herein, but has the widest scope in accordance to the principle and the novel features disclosed herein.

Second Embodiment

A core of the present application is to provide a cooling system and an axial magnetic field motor to improve the cooling efficiency of the motor and prolong the service life of the motor.

In addition, the embodiments shown below do not limit the content of the present application described in the claims in any way. Further, the entire contents of the configurations described in the following embodiments may not be necessary for the solutions of the present application defined in the claims.

Referring to FIGS. 5 to 8, a cooling system in the embodiment of the present application is used for cooling a stator iron core 200b. The cooling system includes: a housing 100b; an enclosed chamber for containing the stator iron core 200b; a liquid spraying cavity 500b for containing liquid, which is provided on the housing 100b; a liquid inlet 300b communicating with the liquid spraying cavity 500b; a liquid outlet 400b communicating with the enclosed chamber; and a liquid spraying hole 600b provided on an inner wall of the housing 100b, which corresponds to the stator iron core 200b.

When adopting the cooling system of the present application, liquid enters the liquid spraying cavity 500b from the liquid inlet 300b, and the liquid is sprayed to the stator iron core 200b located in the enclosed chamber through the liquid spraying hole 600b. After the liquid sprayed from the liquid spraying hole 600b exchanges heat with the stator iron core 200b, it flows out from the liquid outlet 400b. Compared with the conventional art, the circulating liquid directly contacts the stator iron core 200b to exchange heat, thereby improving the cooling efficiency of the motor and prolonging the service life of the motor.

It should be noted that the housing 100b is configured to contain the stator iron core 200b, and an enclosed chamber is formed inside. When the stator iron core 200b is installed in the enclosed chamber, liquid sprayed by the liquid spraying hole 600b may circulate through a gap of the coil of the stator iron core 200b, and finally flow out from the liquid outlet 400b, thereby forming a kind of cooling circulation circuit.

The liquid spraying cavity 500b is provided in a housing wall of the housing 100b, that is, a section where the liquid spraying cavity 500b is provided is a hollow structure. The liquid spraying cavity 500b can be adjusted according to a section where the liquid spraying hole 600b is provided. For example, the housing 100b may surround a peripheral surface section of the stator iron core 200b, or an end surface section of the housing 100b may surround a peripheral surface section of the stator iron core 200b. The installation positions of the liquid inlet 300b and the liquid outlet 400b are further determined according to an installation position of the liquid spraying cavity 500b.

The housing 100b may have any shape, as long as it is capable of accommodating the liquid spraying cavity 500b and the liquid spraying component 600b, it is within the protection scope of the present application. In an embodiment of the present application, the housing 100b includes:

a stator casing 101b surrounding a circumferential surface of the stator iron core 200b;

an upper cover plate 102b and a lower cover plate 103b that close two ends of the stator casing 101b; and an intermediate shaft sleeve 104b located in the middle of the stator casing 101b, where the stator casing 101b, the upper cover plate 102b, the lower cover plate 103b and the intermediate shaft sleeve 104b together define the enclosed chamber.

It can be seen that in the embodiment of the present application, an entirety the housing 100b is divided into four sections, and the housing 100b may also be divided into three sections according to specific requirements. For example, the upper cover plate 102b and the stator casing 101b are treated as a one-piece structure, and the lower cover plate 103b and the stator casing 101b are treated as a one-piece structure. Alternatively, one part of the stator casing 101b and the upper cover plate 102b are treated as a one-piece structure, and the other part of the stator casing 101b and the lower cover plate 103b are treated as a one-piece structure, etc.

In order to further improve the cooling efficiency, in another embodiment of the present application, a first spoiler 700b is provided on an inner wall of the stator casing 101b. An area of the enclosed chamber, which is close to the liquid outlet 400b, is separated as a liquid return area by the first spoiler 700b, and an area close to the liquid spraying hole 600b is separated as a liquid spraying area.

Under the action of the first spoiler 700b, the enclosed chamber is divided into the liquid return area and the liquid spraying area. The liquid spraying hole 600b sprays liquid in the liquid spraying area. After the sprayed liquid exchanges heat with the stator iron core 200b, it is collected in the liquid return area and flows out through the liquid outlet 400b. Therefore, under the action of the first spoiler 700b, the liquid sprayed by the liquid spraying hole 600b can flow uniformly from the outside of the stator iron core 200b to the inside, so that the stator iron core 200b can be uniformly cooled.

The number of the first spoiler 700b may be one or more, as long as the structure is capable of blocking the liquid flow, it is within the protection scope of the present application. In the figure, the number of the first spoiler 700b is two, which are respectively located on two sides of the liquid outlet 400b. As a result, an area between the two first spoilers 700b which is close to the liquid outlet 400b, is formed as the liquid return area, and an area between the two first spoilers 700b which is away from the liquid outlet 400b, is formed as a liquid spraying area. The liquid spraying holes 600b are all provided on an inner wall of the stator casing 101b in the liquid spraying area.

Further, a second spoiler is provided at a section close to the liquid outlet 400b, of the intermediate shaft sleeve 104b. A function of the second spoiler is to cause the liquid located inside the stator iron core 200b to evenly flow from the inside of the stator iron core 200b to the liquid return area, so as to improve the cooling efficiency.

According to the structure of the housing, a liquid spraying cavity 500b may be provided on the stator casing 101b, the upper cover plate 102b or the lower cover plate 103b, and accordingly, the liquid inlet 300b and the liquid outlet 400b may be arranged on the stator casing 101b, the upper cover plate 102b or the lower cover plate 103b. In the embodiment of the present application, the liquid spraying cavity 500b is arranged on the stator casing 101b, and the liquid inlet 300b and/or the liquid outlet 400b are arranged on the stator casing 101b.

The liquid spraying cavity 500b includes one or two liquid inlets 300b. In a case that there is one liquid inlet 300b, the liquid inlet is arranged at one end of the liquid spraying cavity 500b, as shown in FIG. 7; in a case that there are two liquid inlets 300b, the two liquid inlets 300b are arranged at two ends of the liquid spraying cavity 500b, as shown in FIG. 8.

Two liquid inlets 300b are provided, which are respectively located at two ends of the liquid spraying cavity 500b, and an external port of the liquid inlet 300b has one outlet. Or, there is one liquid inlet 300b located at one end of the liquid spraying cavity 500b, and a corresponding external port of the liquid inlet 300b has one outlet.

In a case that the liquid spraying cavity 500b is provided on the stator casing 101b, the liquid spraying cavity 500b may have a ring-shaped structure that surrounds the entire stator casing 101b or a part of the stator casing 101b. In order to simplify the processing technology, the liquid inlet 300b and the liquid outlet 1014b are collectively provided on an external port 1011b of the first housing 100b. Apparently, the external ports 1011b of the liquid inlet 300b and the liquid outlet 1014b may be separately provided as needed.

Further, in a case that two liquid inlets 300b are provided and the two liquid inlets 300b are located at the two ends of the liquid spraying cavity 500ba, in order to avoid the formation of turbulent flow of the liquid located in the middle, a partition plate is provided in the middle of the liquid spraying cavity 500b.

It should be noted that the stator casing 101b is a one-piece structure or a split-type structure. The so-called one-piece structure means that when the stator casing 101b is processed, the structure of the liquid spraying cavity 500b is processed together, for example, in a casting process. In a case that the stator casing 101b has a split-type structure, the stator casing 101b includes: a stator base housing with a hollow structure and a sealing ring for sealing the hollow structure. The sealing ring and the stator base housing jointly define the liquid spraying cavity 500b.

A function of the liquid spraying hole 600b is to cool the stator iron core 200b through spraying. In the embodiment of the present application, the liquid spraying component is a nozzle. The liquid sprayed into the liquid spraying cavity 500b has a certain pressure. Under the action of pressure, after the action of the liquid spraying hole 600b, the sprayed liquid is a fine liquid, thereby increasing the contact area between the liquid and the stator iron core 200b. The number of the liquid spraying hole 600b is one or more, and multiple liquid spraying holes 600b are capable of further increasing a spray area of the liquid spraying hole 600b. Further, each liquid spraying hole 600a corresponds to a coil gap of the stator iron core 200b, and each coil gap corresponds to a liquid spraying hole. The liquid sprayed by the liquid spraying hole can directly contact a heat source, and the cooling effect is better. The liquid can be divided evenly under the action of the first spoiler 700b and the second spoiler, and the cooling is more uniform, which desirably reduces the temperature of the stator iron core 200b.

The present application further discloses a motor, which includes a stator iron core 200b and a cooling system, where the cooling system is the cooling system according to any one of the above aspects. Since the above cooling system has the above effects, the motor including the above cooling system also has corresponding effects, which is not repeated here.

In yet another embodiment of the present application, the motor is a radial magnetic field motor or an axial magnetic field motor, and is preferably selected as an axial magnetic field motor.

Third Embodiment

A core of the present application is to provide a stator component and an axial magnetic field motor to improve the cooling efficiency of the motor and prolong the service life of the motor.

In addition, the embodiments shown below do not limit the content of the present application described in the claims in any way. Further, the entire contents of the configurations described in the following embodiments may not be necessary for the solutions of the present application defined in the claims.

Referring to FIGS. 9 to 14, a stator component in an embodiment of the present application includes a housing 100c, and a stator iron core 200c provided inside the housing 100c; where the stator iron core 200c and the housing 100c define a first cooling space 300c, and a middle portion of the stator iron core 200c defines a second cooling space 400c;

the housing 100c is provided with a liquid inlet cavity 101c and a liquid outlet cavity 102c;

a liquid inlet 105c communicating with the liquid inlet cavity 101c and a liquid outlet 106c communicating with the liquid outlet cavity 102c are provided on an outer wall of the housing 100c; among the multiple housings 100c, the liquid outlet 106c of the front housing 100c is in communication with the liquid inlet 105c of the rear housing 100c;

a first intermediate liquid port 103c communicating with the liquid inlet cavity 101c and a second intermediate liquid port 104c communicating with the liquid outlet cavity 102c are provided on an inner wall of the housing 100c; and multiple cooling passages 201c are provided on the stator iron core 200c, and the first cooling space 300c and the second cooling space 400c are communicated with each other through the cooling passages 201c.

When adopting the stator component of the present application, cooling liquid enters the liquid inlet cavity 101c from the liquid inlet 105c, and enters the first cooling space 300c through the first intermediate liquid port 103c. Then, the cooling liquid enters the second cooling space 400c through the cooling passage 201c, and then it enters the first cooling space 300c through the cooling passage 201c, and then enters the liquid outlet cavity 102c through the second intermediate liquid port 104c, and finally flows out from the liquid outlet 106c. The cooling liquid is capable of directly contacting the stator iron core 200c for heat exchange during the process that the cooling liquid flows through the first cooling space 300c, the cooling passage 201c, and the second cooling space 400c, thereby improving the cooling efficiency of the motor and prolonging the service life of the motor.

In order to prevent liquid leakage, in the embodiment of the present application, the stator iron core 200c is enclosed, by a stator pressing plate 600c, in a space defined by the housing 100c and the stator pressing plate 600c.

In order to increase the cooling effect, in another embodiment of the present application, a spoiler 500c for separating the first cooling space 300c is further provided between the housing 100c and the stator iron core 200c. By providing the spoiler 500c, cooling liquid entering the first cooling space 300c flows according to a predetermined trajectory, so as to prolong the contact time of the cooling liquid with the stator iron core 200c. Further, the spoiler 500c is provided so that the cooling liquid can flow through most of the cooling passages 201c on the stator iron core 200c, so that the temperature on the stator iron core 200c is more uniform.

Among them, in the embodiment of the present application, the number of the spoiler 500c is two, and the two spoilers 500c are arranged symmetrically. The two spoilers 500c separate the first cooling space 300c into two areas, which are respectively a first cooling area 301c and a second cooling area 302c, where the first cooling area 301c corresponds to the liquid inlet cavity 101c, and the second cooling area 302c corresponds to the liquid outlet cavity 102c. During a cooling process of cooling liquid, the cooling liquid in the liquid inlet cavity 101c enters the first cooling area 301c through the first intermediate liquid port 103c, and the cooling liquid in the first cooling area 301c enters the second cooling space 400c through the cooling passage 201c corresponding to the first cooling area 301c. The cooling liquid in the second cooling space enters the second cooling area 302c through the cooling passage 201c corresponding to the second cooling area 302c, and the cooling liquid in the second cooling area 302c enters the liquid outlet cavity 102c through the second intermediate liquid port 104c.

It should be noted that, in the embodiment of the present application, the stator component includes one or more housings 100c. In a case that there are multiple housings 100c, each housing 100c is correspondingly installed with one stator iron core 200c. All the multiple housings 100c may be two housings 100c, three housings 100c, four housings 100c, and etc. The number of housing 100c may be determined according to the output power level.

The multiple housings 100c are arranged coaxially, that is, an end face of one housing 100c abuts against an end face of an adjacent housing 100c.

Among the two housings 100c, the liquid outlet 106c of one housing 100c is in communication with the liquid inlet 105c of the other housing 100c. The communication may be made through an external pipeline, or the liquid inlet 105c of one housing 100c and the liquid outlet 106c of the other housing 100c are coaxially arranged. That is, the liquid outlet 106c and the liquid inlet 105c are both arranged on the end surface, and when the two housings 100c are butted with each other, the liquid outlet 106c and the liquid inlet 105c are communicated.

Two housings 100c are provided by way of example, where the liquid outlet 106c of one housing 100c is arranged on an end face, and the liquid inlet 105c of the other housing 100c is arranged on the end face, and when the two housings 100c are butted with each other, the liquid outlet 106c of the front housing 100c is in communication with the liquid inlet 105c of the rear housing 100c.

Among the multiple housings 100c, each of the liquid inlet 105c of a housing 100c at one end and the liquid outlet 106c of the housing 100c at the other end may be located on an end surface of a corresponding housing 100c, or may be located at a circumferential surface of the corresponding housing 100c. Preferably, in order to facilitate the installation of rear parts, in the embodiment of the present application, the liquid inlet 105c of the housing 100c at one end and the liquid outlet 106c of the housing 100c at the other end may both be located on a circumferential surface of a corresponding housing 100c. Further, the liquid inlet 105c of the housing 100c at one end and the liquid outlet 106c of the housing 100c at the other end are both arranged on the same side.

In the embodiment of the present application, a function of the cooling passage 201c is a path to communicate the first cooling space 300c with the second cooling space 400c. Moreover, cooling liquid in the cooling passage 201c directly contacts the stator iron core 200c, and directly takes heat generated by the stator iron core 200c away. Where, the cooling passage 201c is a through hole penetrating through the stator iron core 200c, and a cross section of the through hole is circular, elliptical, rectangular, etc. Alternatively, the cooling passage 201c is encircled by a groove provided on an end surface of the stator iron core 200c and the housing 100c. It can be understood that, a groove is provided on an end surface of the stator iron core 200c, and a corresponding housing 100c is a planar structure; the cooling passage 201c is encircled by the groove and the surface of the corresponding housing 100c; or the stator iron core 200c is provided with a groove, a surface of a corresponding housing 100c is provided with a groove, and the two grooves are butted to form the cooling passage 201c.

In yet another embodiment of the present application, the number of housing 100c is two, which are respectively a front housing 100-1c and a rear housing 100-2c; the number of stator iron core 200c is two, which are respectively a front stator iron core 200-1c and a rear stator iron core 200-2c. Reference is made to the above embodiments for the structure of the front housing 100-1c and the rear housing 100-2c.

In order to prevent liquid leakage, in the embodiment of the present application, the front stator iron core 200-1c is enclosed, by a front stator pressing plate 600-1c, in a space defined by the front housing 100-1c and the front stator pressing plate 600-1c.

A front spoiler 500-1c is provided between the front housing 100-1c and the front stator iron core 200-1c.

In order to prevent liquid leakage, in the embodiment of the present application, the rear stator iron core 200-2c is enclosed, by a rear stator pressing plate 600-2c, in a space defined by the rear housing 100-2c and the rear stator pressing plate 600-2c.

A rear spoiler 500-2c is provided between the rear housing 100-2c and the rear stator iron core 200-2c.

The present application further discloses an axial magnetic field motor, which includes the stator component according to any one of the above aspects. Since the above stator component has the above effects, the axial magnetic field motor including the above stator component also has corresponding effects, which is not repeated here.

Fourth Embodiment

A core of the present application is to provide a cooling system, a stator component and an axial magnetic field motor to improve the cooling efficiency of the motor and prolong the service life of the motor.

In addition, the embodiments shown below do not limit the content of the present application described in the claims in any way. Further, the entire contents of the configurations described in the following embodiments may not be necessary for the solutions of the present application defined in the claims.

Referring to FIGS. 15 to 20, a cooling system in the embodiment of the present application includes a housing 101d, which has an installation position 102d at the bottom for installing a stator iron core 200d; The cooling system 100d further includes:

an oil inlet cavity 103d and an oil return cavity 104d, which are provided in the housing 101d;

an oil inlet 105d and an oil outlet 106d, which are provided on an outer wall of the housing 101d, where the oil inlet 105d is communicated with the oil inlet cavity 103d, and the oil outlet 106d is communicated with the oil return cavity 104d;

an oil spraying hole 107d and an oil return hole 108d, which are provided on an inner wall of the housing 101d, where the oil spraying hole 107d is communicated with the oil inlet cavity 103d, and the oil return hole 108d is communicated with the oil return cavity 104d; and multiple oil diverting grooves 109d provided at the bottom of the housing 101d, where the oil diverting grooves 109d penetrate through the installation position 102d.

When adopting the stator component of the present application, cooling oil enters the oil inlet cavity 103d from the oil inlet 105d, and enters the inside of the housing 101d through the oil spraying hole 107d. The cooling oil entering the inside of the housing 101d is capable of directly contacting the stator iron core 200d provided inside the housing 101d, and after the contact heat exchange, the cooling oil enters the oil return cavity 104d through the oil return hole 108d, and finally flows out from the oil outlet 106d. Since the cooling liquid is capable of directly contacting the stator iron core 200d for heat exchange, the cooling efficiency of the motor is thereby improved, and the service life of the motor is prolonged.

The cooling system 100d includes one or more housings 101d. In a case that there are multiple housings 101d, the multiple housings 101d may be two housings 101d, three housings 101d, four housings 101d, and etc. The number of housing 101d may be determined according to the output power level.

The multiple housings 101d are arranged coaxially, that is, an end face of one housing 101d abuts against an end face of an adjacent housing 100d.

Among two adjacent housings 101d, the oil outlet 106d of the front housing 101d is in communication with the oil inlet 105d of the rear housing 101d. The communication may be made through multiple ways, specifically, may be made through an external pipeline. Alternatively, the oil inlet 105d of the front housing 101d and the oil outlet 106d of the rear housing 101d are coaxially arranged. That is, the liquid outlet 106d and the liquid inlet 105d are both arranged on the end surface, and when the two housings 101d are butted with each other, the liquid outlet 106d and the liquid inlet 105d are communicated.

Two housings 101d are provided by way of example, where the oil outlet 106d of one housing 101d is arranged on an end face, and the oil inlet 105d of the other housing 101d is arranged on the end face, and when the two housings 101d are butted with each other, the oil outlet 106d of the front housing 101d is in communication with the oil inlet 105d of the rear housing 101d.

Among the multiple housings 101d, each of the oil inlet 105d of the housing 101d at one end and the oil outlet 106d of the housing 101d at the other end may be located on an end surface of a corresponding housing 101d, or may be located at a circumferential surface of the corresponding housing 101d. Preferably, in order to facilitate the installation of rear parts, in the embodiment of the present application, the oil inlet 105d of the housing 101d at one end and the oil outlet 106d of the housing 101d at the other end may both be located on a circumferential surface of a corresponding housing 101d. Further, the oil inlet 105d of the housing 101d at one end and the oil outlet 106d of the housing 101d at the other end are both arranged on the same side.

A stator component is further disclosed by the present application, including a stator iron core 200d and the cooling system 100d of any one of the above aspects, where the stator iron core 200d is arranged on the installation position 102d of the housing 101d of the cooling system 100d, where an outer ring of the stator iron core 200d and the housing 101d define a first cooling space 400d, and an inner ring of the stator iron core 200d and the housing 101d define a second cooling space 500d.

In order to increase the cooling effect, in another embodiment of the present application, a spoiler 201d for separating the first cooling space 400d is further provided between the housing 101d and the stator iron core 200d. By providing the spoiler 201d, cooling oil entering the first cooling space 400d flows according to a predetermined trajectory, so as to prolong the contact time of the cooling oil with the stator iron core 200d. Further, the spoiler 201d is provided so that the cooling oil can flow through most of the cooling passages 109d, so that the temperature on the stator iron core 200d is more uniform.

Among them, in the embodiment of the present application, the number of the spoiler 201d is two, and the two spoilers 201d are arranged symmetrically. The two spoilers 201d separate the first cooling space 400d into two areas, which are respectively a first cooling area and a second cooling area, where the first cooling area corresponds to the oil inlet cavity 103d, and the second cooling area corresponds to the oil outlet cavity 104d. During a cooling process of the cooling oil, the cooling oil in the oil inlet cavity 103d enters the first cooling area through the oil spraying hole 103d, and the cooling oil in the first cooling area enters the second cooling space 500d through the oil diverting groove 109d corresponding to the first cooling area. The cooling oil in the second cooling space enters the second cooling area through the oil diverting groove 109d corresponding to the second cooling area, and the cooling oil in the second cooling area enters the oil return cavity 104d through the oil return hole 108d.

In the embodiment of the present application, the number of the oil diverting groove 109d is plural, and the number of the oil diverting grooves 109d is the same as the number of teeth of the stator iron core 200d, or may be different. In the embodiment of the present application, the number of the oil diverting grooves 109d is the same as the number of teeth of the stator iron core 200d.

Further, the oil diverting groove 109d corresponds to a coil gap of the stator iron core 200d. Since the coil is the main heat-generating component in the stator iron core 200d, when the oil diverting groove 109d corresponds the coil gap of the stator iron core 200d, cooling oil entering the oil diverting groove 109d is capable of fully contacting a tooth groove of the stator iron core 200d, so that the cooling effect can be further improved.

In order to prevent liquid leakage, in the embodiment of the present application, the stator iron core 200d is enclosed, by a sealing cover plate 300d, in a space defined by the housing 101d and the sealing cover plate 300d. Where, the sealing cover plate 300d is fixed on the housing 101d by screws, other ways such as welding, riveting, or dovetailing may also be used. One end of the sealing cover plate 300d close to the stator iron core 200d is further provided with a clamping slot 301d for clamping the stator iron core.

The present application further discloses an axial magnetic field motor, which includes the stator component according to any one of the above aspects. Since the above stator component has the above effects, the axial magnetic field motor including the above stator component also has corresponding effects, which is not repeated here.

Fifth Embodiment

A core of the present application is to provide a stator component and an axial magnetic field motor to improve the cooling efficiency of the motor and prolong the service life of the motor.

In addition, the embodiments shown below do not limit the content of the present application described in the claims in any way. Further, the entire contents of the configurations described in the following embodiments may not be necessary for the solutions of the present application defined in the claims.

Referring to FIGS. 21 to 26, the stator component in the embodiment of the present application includes:

a housing 100e, a stator iron core 300e, a coil 400e, a pole shoe 500e, and a stator cover plate 200e, where the stator iron core 300e, the coil 400e and the pole shoe 500e are provided in a space defined by the housing 100e and the stator cover plate 200e; the coil 400e is provided in an open slot 302e of the stator iron core 300e; the pole shoe 500e is fixed on the stator cover plate 200e, and when the stator cover plate 200e is butted with the housing 100e, the pole shoe 500e can be arranged at a notch of the open slot 302e; an outer ring of the stator iron core 300e and the housing 100e define a first cooling space 600e, and an inner ring of the stator iron core 300e and the housing 100e define a second cooling space 700e communicating with the first cooling space 600e;

a housing wall of the housing 100e is provided with an oil inlet cavity 101e and an oil return cavity 102e, and an outer wall of the housing 100e is provided with an oil inlet 103e and an oil outlet 104e; where the oil inlet 103e is communicated with the oil inlet cavity 101e, and the oil outlet 104e is communicated with the oil return cavity 102e; an inner wall of the housing 100e is provided with an oil spraying hole 105e and an oil return hole 106e, and the first cooling space 600e and the oil inlet cavity 101e are communicated with each other through the oil spraying hole 105e, and the first cooling space 600e and the oil return cavity 102e are communicated with each other through the oil return hole 106e.

The stator iron core 300e in the present application has an open slot 302e, which facilitates the installation of the coil 400e. Besides, the pole shoe 500e is fixed on the stator cover plate 200e. When the stator cover plate 200e is butted with the housing 100e, the pole shoe 500e corresponding to the notch of the open slot 302e is capable of reducing the tooth harmonics of the motor, reducing the iron loss of the motor, improving the efficiency of the motor, which may further reduce the torque ripple of the motor. Since the pole shoe 500e is carried on the stator cover plate 200e, when the stator cover plate 200e is directly butted with the housing 100e during installation, the pole shoe 500e can be matched with the open slot 302e, thereby improving the production efficiency of the motor.

When adopting the stator component of the present application, cooling oil enters the oil inlet cavity 101e from the oil inlet 103e, and enters the inside of the housing 100e through the oil spraying hole 105e. The cooling oil entering the inside of the housing 100e is capable of directly contacting the stator iron core 300e provided inside the housing 100e, and after the contact heat exchange, the cooling oil enters the oil return cavity 102e through the oil return hole 106e, and finally flows out from the oil outlet 104e. Since the cooling liquid is capable of directly contacting the stator iron core 300e for heat exchange, the cooling efficiency of the motor is thereby improved, and the service life of the motor is prolonged.

It should be noted that the stator cover plate 200e in the present application is fixed on the housing 100e by screws or pressing plate, other ways such as welding, riveting, or dovetailing may also be used. Correspondingly, the stator cover plate 200e and the housing 100e are provided with mounting holes for mounting screws, a station for setting the pressing plate, riveting holes, and a dovetail structure to realize the fixation of the stator cover plate 200e with the housing 100e.

The stator iron core 300e has an open slot 302e and teeth 301e. The open slot 302e is configured to install the coil 400e. There is one open slot 302e between each tooth. By providing the open slot 302e, the installation of the coil 400e may be facilitated, where the coil 400e is a formed coil or is wound on the teeth in sequence. The formed coil is a rectangular copper wire formed coil, or a round copper wire pre-wound formed coil.

The stator cover plate 200e is generally made of non-magnetic conductive high-strength glass fiber composite material or high-strength plastic (such as PPS, PEEK, etc.). An end surface, close to the stator iron core 300e, of the stator cover plate 200e is provided with a groove rib 201e extending in a radial direction of the stator cover plate 200e and an iron core tooth groove 202e corresponding to the stator iron core 300e. The position alignment of the stator cover plate 200e with the housing 100e may be facilitated by providing the groove rib 201e and the iron core tooth groove 202e. The number of groove rib 201e is the same as or different from the number of open slot 302e. The number of groove rib 201e is equal to the number of open slot 302e of the stator iron core 300e, which can facilitate the position alignment of the stator cover plate 200e with the housing 100e. One pole shoe 500e is provided on two sides of each groove rib 201e, that is, the pole shoe 500e is pasted on two sides of the groove rib 201e, and the remaining iron core tooth groove 202e is fitted to tooth surfaces of the whole iron core. A thickness of the cover plate at a tooth groove section of the iron core tooth needs to be as thin as possible to reduce an air gap between the stator and a rotor.

Each stator component has one housing. Multiple stator components may be coaxially arranged, and multiple housings 100e are arranged coaxially, that is, an end face of one housing 100e abuts against an end face of an adjacent housing 100d.

Among two adjacent housings 100e, the oil outlet 104e of the front housing 100e is in communication with the oil inlet 103e of the rear housing 100e. The communication may be made through multiple ways, specifically, may be made through an external pipeline. Alternatively, the oil inlet 103e of the front housing 100e and the oil outlet 104e of the rear housing 100e are coaxially arranged. That is, the liquid outlet 104e and the liquid inlet 103e are both arranged on the end surface, and when the two housings 100e are butted with each other, the liquid outlet 104e and the liquid inlet 103e are communicated.

Two housings 100e are provided by way of example, where the oil outlet 104e of one housing 100e is arranged on an end face, and the oil inlet 103e of the other housing 100e is arranged on the end face, and when the two housings 100e are butted with each other, the oil outlet 104e of the front housing 100e is in communication with the oil inlet 103e of the rear housing 100e.

Among the multiple housings 100e, each of the oil inlet 103e of the housing 100e at one end and the oil outlet 104e of the housing 100e at the other end may be located on an end surface of a corresponding housing 100e, or may be located at a circumferential surface of the corresponding housing 100e. Preferably, in order to facilitate the installation of rear parts, in the embodiment of the present application, the oil inlet 103e of the housing 100e at one end and the oil outlet 104e of the housing 100e at the other end may both be located on a circumferential surface of a corresponding housing 100e. Further, the oil inlet 103e of the housing 100e at one end and the oil outlet 104e of the housing 100e at the other end are both arranged on the same side.

In an embodiment of the present application, the pole shoe 500e extends along a length direction of the stator cover plate 200e. In a radial direction of the stator cover plate 200e, the length of the pole shoe 500e is the same as the length of the notch of the open slot 302e.

In an embodiment of the present application, a sum of widths of the groove rib 201e and the pole shoe 500e located on the two sides of the groove rib 201e equals to a width of the notch of the open slot 302e.

The pole shoe 500e is molded from SMC ferromagnetic powder or other magnetic conductive powder (e.g., ferrite powder), and has a rectangular shape.

The present application further discloses an axial magnetic field motor, which includes the stator component according to any one of the above aspects. Since the above stator component has the above effects, the axial magnetic field motor including the above stator component also has corresponding effects, which is not repeated here.

According to the above description of the disclosed embodiments, those skilled in the art may implement or practice the present application. Various modifications to the embodiments are apparent to those skilled in the art. The general principle defined herein may be implemented in other embodiments without departing from the spirit or scope of the present application. Therefore, the present application should not be limited to the embodiments disclosed herein, but has the widest scope in accordance to the principle and the novel features disclosed herein.

The invention claimed is:

1. A cooling system for cooling a stator iron core, comprising a housing and an enclosed chamber for containing the stator iron core, wherein the cooling system further comprises:
   a liquid spraying cavity for containing liquid, which is provided on the housing;
   a liquid inlet communicating with the liquid spraying cavity;
   a liquid outlet communicating with the enclosed chamber; and
   a liquid spraying component provided on an inner wall of the housing, which corresponds to the stator iron core.

2. The cooling system of claim 1, wherein the housing comprises:
   a stator casing surrounding a circumferential surface of the stator iron core;
   an upper cover plate and a lower cover plate that close two ends of the stator casing; and
   an intermediate shaft sleeve located in the middle of the stator casing, wherein the stator casing, the upper cover plate, the lower cover plate and the intermediate shaft sleeve together define the enclosed chamber.

3. The cooling system according to claim 2, wherein a first spoiler is provided on an inner wall of the stator casing; an area of the enclosed chamber, which is close to the liquid outlet, is separated as a liquid return area by the first spoiler, and an area of the enclosed chamber close to the liquid spraying component is separated as a liquid spraying area.

4. The cooling system according to claim 3, wherein the number of the first spoiler is two, and the two first spoilers are respectively located on two sides of the liquid outlet.

5. The cooling system according to claim 2, wherein a second spoiler is provided at a section close to the liquid outlet, of the intermediate shaft sleeve.

6. The cooling system according to claim 2, wherein the liquid inlet and/or the liquid outlet are provided on the stator casing.

7. The cooling system according to claim 1, wherein the liquid inlet and the liquid outlet are collectively arranged on an external port of the housing.

8. The cooling system according to claim 1, wherein the liquid spraying cavity has a ring-shaped structure.

9. The cooling system according to claim 1, wherein the number of the liquid spraying component is plural and each of the liquid spraying components corresponds to a coil gap of the stator iron core.

10. An axial magnetic field motor, comprising a stator iron core and a cooling system, wherein the cooling system is the cooling system according to claim 1.

11. A stator component, comprising a housing and a stator iron core provided inside the housing; wherein the stator iron core and the housing define a first cooling space, and a middle portion of the stator iron core defines a second cooling space;
   the housing is provided with a liquid inlet cavity and a liquid outlet cavity;
   a liquid inlet communicating with the liquid inlet cavity and a liquid outlet communicating with the liquid outlet cavity are provided on an outer wall of the housing;
   a first intermediate liquid port communicating with the liquid inlet cavity and a second intermediate liquid port communicating with the liquid outlet cavity are provided on an inner wall of the housing; and
   a plurality of cooling passages are provided on the stator iron core, and the first cooling space and the second cooling space are communicated with each other through the cooling passages.

12. The stator component according to claim 11, wherein a spoiler for separating the first cooling space is further provided between the housing and the stator iron core.

13. The stator component according to claim 12, wherein the number of the spoiler is two, the two spoilers are arranged symmetrically, the two spoilers separate the first cooling space into a first cooling area and a second cooling area, wherein the first cooling area is communicated with the liquid inlet cavity through the first intermediate liquid port, and the second cooling area is communicated with the liquid outlet cavity through the second intermediate liquid port.

14. The stator component according to claim 11, wherein the stator iron core is enclosed, by a stator pressing plate, in a space defined by the housing and the stator pressing plate.

15. The stator component according to claim 11, wherein the cooling passages are through holes penetrating through the stator iron core.

16. The stator component according to claim 11, wherein the cooling passages are grooves provided on an end surface of the stator iron core.

17. The stator component according to claim 11, wherein the number of the housing is plural, and among the plurality of housings, the liquid outlet of the front housing is communicated with the liquid inlet of the rear housing.

18. The stator component according to claim 17, wherein in two adjacent housings, the liquid inlet of one housing is arranged coaxially with the liquid outlet of the other housing.

19. The stator component according to claim 18, wherein the number of the housings is two, which respectively are a front housing and a rear housing; the number of the stator iron core is two, which respectively are a front stator iron core and a rear stator iron core.

\* \* \* \* \*